US012593261B2

(12) United States Patent
Walldeen et al.

(10) Patent No.: US 12,593,261 B2
(45) Date of Patent: Mar. 31, 2026

(54) METHODS FOR INTER IAB-DONOR-DU BAP TUNNELING

(71) Applicant: TELEFONAKTIEBOLAGET LM ERICSSON (PUBL), Stockholm (SE)

(72) Inventors: Thomas Walldeen, Linköping (SE); Filip Barac, Huddinge (SE); Jose Luis Pradas, Stockholm (CA); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 341 days.

(21) Appl. No.: 18/558,400

(22) PCT Filed: May 6, 2022

(86) PCT No.: PCT/IB2022/054234
§ 371 (c)(1),
(2) Date: Nov. 1, 2023

(87) PCT Pub. No.: WO2022/234538
PCT Pub. Date: Nov. 10, 2022

(65) Prior Publication Data
US 2024/0224154 A1 Jul. 4, 2024

Related U.S. Application Data

(60) Provisional application No. 63/185,708, filed on May 7, 2021.

(51) Int. Cl.
H04W 40/02 (2009.01)
H04L 45/74 (2022.01)

(52) U.S. Cl.
CPC ............. *H04W 40/02* (2013.01); *H04L 45/74* (2013.01)

(58) Field of Classification Search
None
See application file for complete search history.

(56) References Cited

U.S. PATENT DOCUMENTS 11,876,777 B2 * 1/2024 Akl ........................ H04W 40/36
2022/0174579 A1 * 6/2022 Zhuo ........................ H04L 45/74
(Continued)

FOREIGN PATENT DOCUMENTS

EP 4017115 A1 6/2022
WO 2021027949 A1 2/2021

OTHER PUBLICATIONS

3GPP TR 38.874 v16.0.0 Technical Report; 3rd Generation Partnership Project; Technical Specification Group Radio Access Network; NR; Study on Integrated Access and Backhaul (Release 16)—Dec. 2018.
(Continued)

*Primary Examiner* — Brian S Roberts
(74) *Attorney, Agent, or Firm* — Ericsson Inc.

(57) ABSTRACT

There is provided a method performed by a first donor distributed unit (DU) for routing traffic to a second donor DU in an Integrated Access Backhaul (IAB) network. The method may comprise: receiving an uplink (UL) packet, destined to the second donor DU, from an IAB node, which has a communication path to the second donor DU that is unavailable; appending a header pertaining to a tunnel to the UL packet; and sending the UL packet through the tunnel to the second donor DU, the tunnel being established between the first donor DU and the second donor DU.

20 Claims, 13 Drawing Sheets

(56)                     References Cited

U.S. PATENT DOCUMENTS

| | | | |
|---|---|---|---|
| 2023/0199879 A1* | 6/2023 | Zhu | H04W 36/0033 |
| | | | 370/329 |
| 2023/0388894 A1* | 11/2023 | Chen | H04L 45/24 |
| 2023/0413154 A1* | 12/2023 | Liu | H04W 40/02 |

OTHER PUBLICATIONS

3GPP TS 38.300 V16.5.0, "3rd Generation Partnership Project; Technical Specification Group Radio Access Network; NR; NR and NG-RAN Overall Description; Stage 2" (Release 16) Mar. 2021.
3GPP TS 38.322 V16.2.0 (Dec. 2020), 3rd Generation Partnership Project; Technical Specification Group Radio Access Network; NR; Radio Link Control (RLC) protocol specification (Release 16).

3GPP TS 38.401 V16.5.0 , "3rd Generation Partnership Project; Technical Specification Group Radio Access Network; NG-RAN; Architecture description" (Release 16) Apr. 2021.
3GPP TS 38.423 V16.5.0 Author Unknown, Technical Specification Group Radio Access Network; NG-RAN; Xn application protocol (XnAP) (Release 16) Apr. 2021, 3GPP Organizational Partners, 461 pages.
Lenovo, Motorola Mobility, "Discussion on IAB packet rerouting", 3GPP TSG-RAN WG2 Meeting #113, electronic R2-2101142, Online, pp. 1-4, Jan. 25-Feb. 5, 2021.
Qualcomm, Backhaul transport for inter-donor redundancy, 3GPP Draft; R3-211741 Vol. RAN WG3, No. E-meeting; May 17, 2021-May 28, 2021, pp. 1-10, May 2021.
Qualcomm, IAB enhancements for inter-donor topological redundancy, 3GPP TSG-RAN WG3 Meeting #110-e, R3-206258, E-meeting, Nov. 2-12, 202, pp. 1-6.
ZTE et al., "Further considerations on inter-donor IAB Node Migration Procedure", 3GPP TSG-RAN WG3 #111-e, Online, Jan. 25-Feb. 4, 2021, pp. 1-20, R3-210207, 3GPP.

* cited by examiner

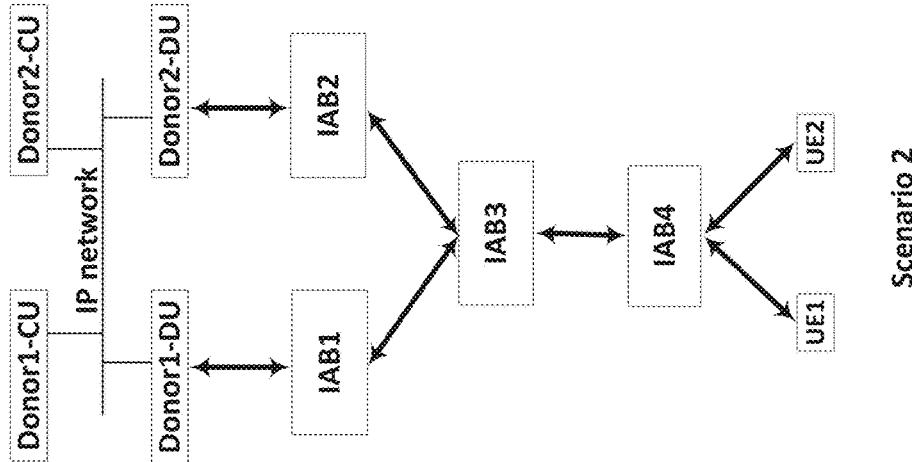
Scenario 2
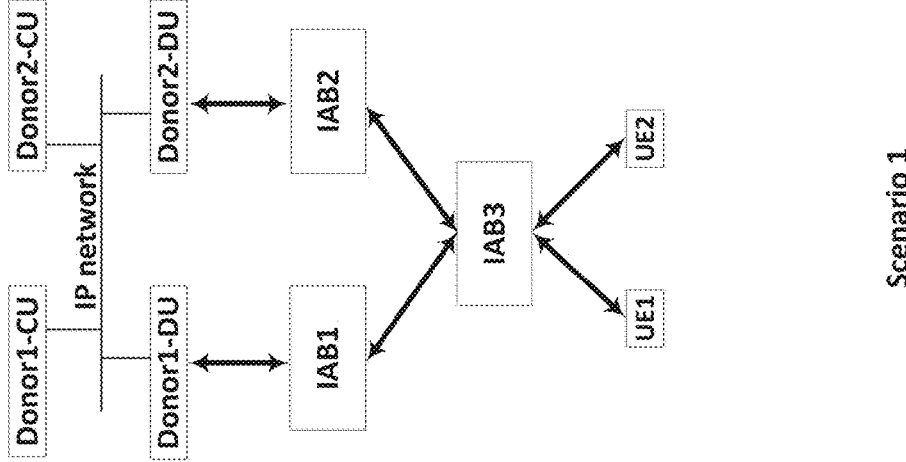
Scenario 1
FIG. 9

100

104        102        106

110

112        100

120

104        122

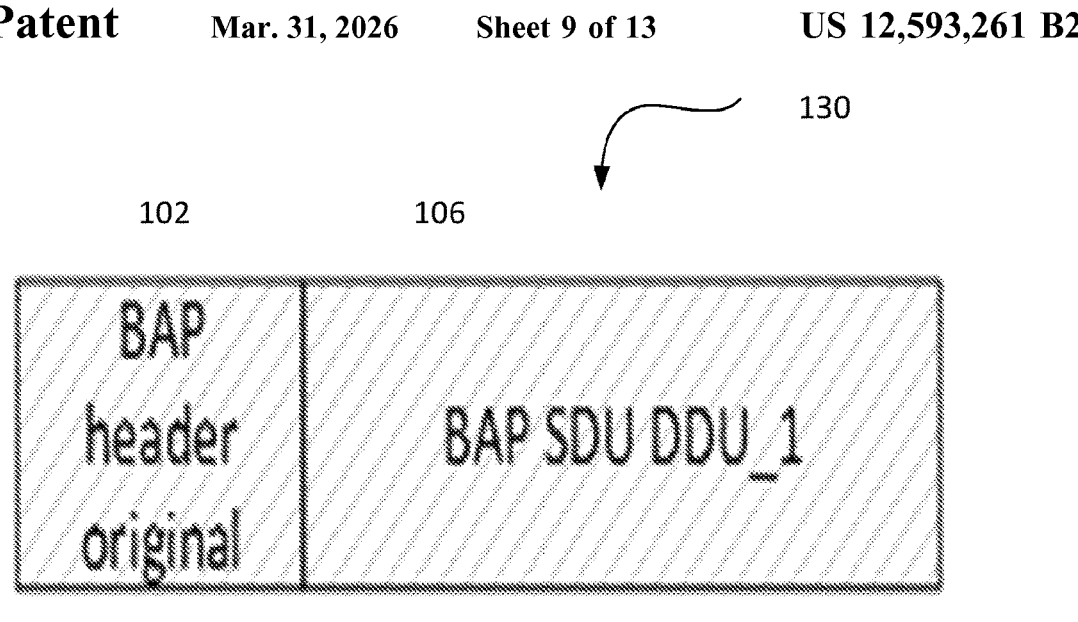

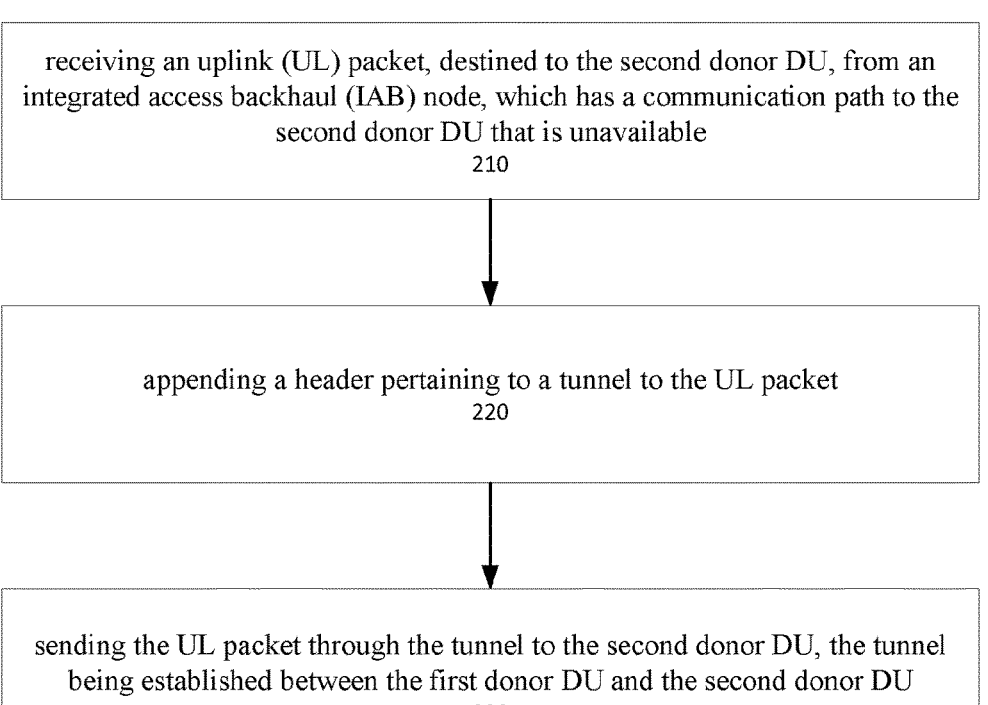

200 receiving an uplink (UL) packet, destined to the second donor DU, from an integrated access backhaul (IAB) node, which has a communication path to the second donor DU that is unavailable
210 appending a header pertaining to a tunnel to the UL packet
220 sending the UL packet through the tunnel to the second donor DU, the tunnel being established between the first donor DU and the second donor DU
230

FIG. 14

300 receiving an uplink (UL) packet from the first donor DU, via a tunnel being established between the first donor DU and the second donor DU, the UL packet having a header pertaining to the tunnel and destined to the second donor DU and originated from an IAB node which has a communication path to the second donor DU that is unavailable
310 removing the header pertaining to the tunnel from the UL packet
320 sending the UL packet to a network node
330

FIG. 15

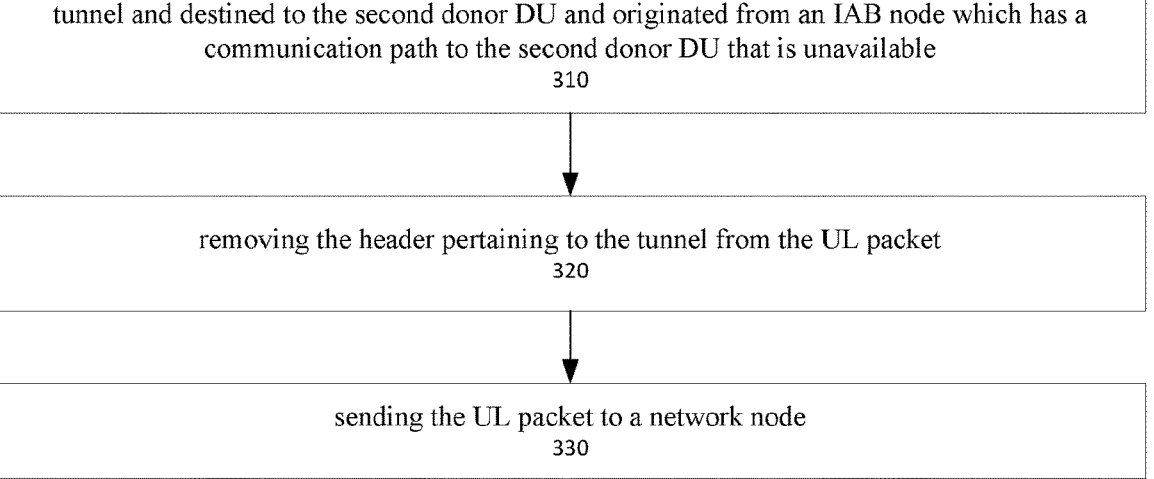

400 rreceiving a downlink (DL) packet, from a centralized unit (CU)
410 appending a header pertaining a tunnel to the DL packet
420 sending the DL packet with the appended header to the second donor DU via the tunnel, the tunnel being established between the first donor DU and the second donor DU
430

FIG. 16

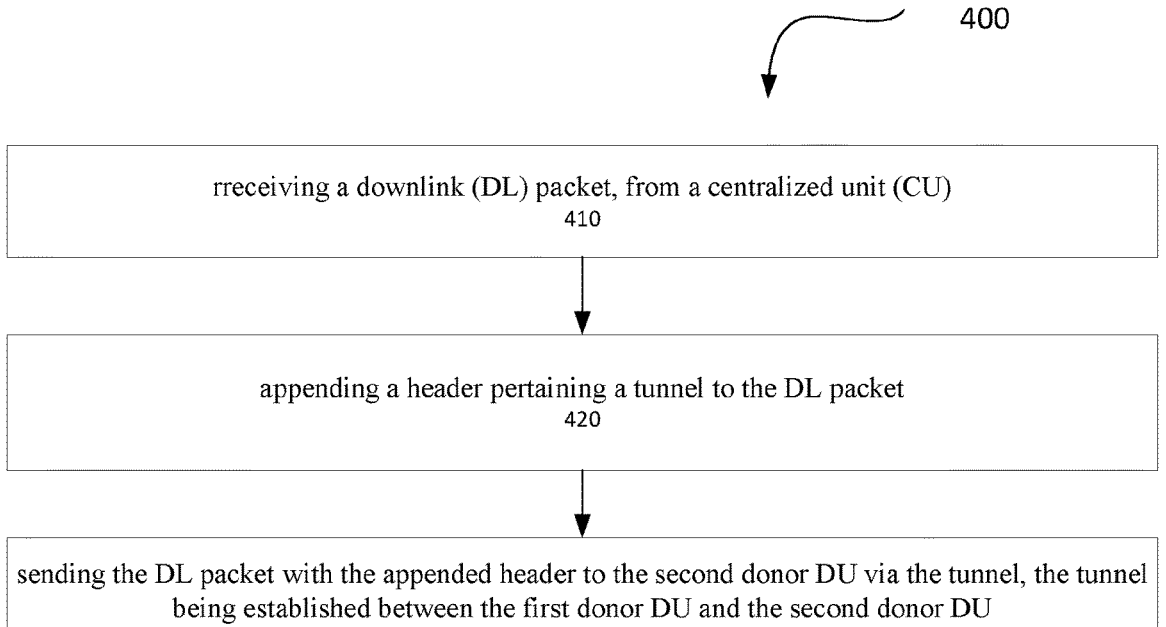

COMMUNICATION SYSTEM
1700

HOST
1716

TELECOMMUNICATION NETWORK
1702

CORE NETWORK
1706

CORE NETWORK NODE
1708

ACCESS NETWORK
1704

NETWORK NODE
1710A

NETWORK NODE
1710B

UE
1712A

UE
1712B

HUB
1714

UE
1712C

UE
1712D

METHODS FOR INTER IAB-DONOR-DU BAP TUNNELING

RELATED APPLICATIONS

This application claims the benefit of and priority to U.S. Provisional Patent Application No. 63/185,708, filed May 7, 2021, entitled "Methods for inter IAB-donor-DU BAP tunneling", the disclosure of which is incorporated herein by reference in its entirety.

FIELD

This application is related to wireless communications and more particularly to methods and nodes for inter-IAB-donor-Du BAP tunneling.

BACKGROUND

Integrated Access and Backhaul (IAB) Networks

Third Generation Partnership Project (3GPP) has completed the integrated access and wireless access backhaul in New Radio (NR) Rel-16 and is currently standardizing the IAB Release-17 (Rel-17).

A Mobile-Termination (MT) function has been defined as a component of the IAB node. In the context of this study, MT is referred to as a function residing on an IAB-node that terminates the radio interface layers of the backhaul Uu interface toward the IAB-donor or other IAB-nodes.

FIG. 1 shows a high-level architectural view of an IAB network. For example, FIG. 1 shows a reference diagram for IAB in standalone mode, which contains one IAB-donor and multiple IAB-nodes. The IAB-donor is treated as a single logical node that comprises a set of functions such as gNB-Distributed Unit (DU), gNB-Centralized Unit (CU)-CP (control plane), gNB-CU-UP (user plane) and potentially other functions. In a deployment, the IAB-donor can be split according to these functions, which can all be either collocated or non-collocated as allowed by 3GPP next generation-Radio access network (NG-RAN) architecture. IAB-related aspects may arise when such split is exercised. Also, some of the functions presently associated with the IAB-donor may eventually be moved outside of the donor, in case it becomes evident that they do not perform IAB-specific tasks.

The baseline user plane and control plane protocol stacks for IAB are shown in FIGS. 2 and 3. As shown, the chosen protocol stacks reuse the current CU-DU split specification in Rel-15, where the full user plane F1-U (GPRS tunnelling Protocol (GTP)-U/User Datagram protocol (UDP)/Internet Protocol (IP)) is terminated at the IAB node (like a normal DU) and the full control plane F1-C(F1-AP/SCTP/IP) is also terminated at the IAB node (like a normal DU). In these cases, Network Domain Security (NDS) has been employed to protect both UP and CP traffic (IPsec in the case of UP, and datagram Transport layer security (DTLS) in the case of CP). IPsec could also be used for the CP protection instead of DTLS (in this case no DTLS layer would be used).

A new protocol layer called Backhaul Adaptation Protocol (BAP) has been introduced in the IAB nodes and the IAB donor, which is used for routing of packets to the appropriate downstream/upstream node and also mapping the UE bearer data to the proper backhaul (BH) Radio link Control (RLC) channel (and also between ingress and egress backhaul RLC channels in intermediate IAB nodes) to satisfy the end-to-end Quality of Service (QoS) requirements of bearers.

Therefore, the BAP layer is in charge of handling the BH RLC channel, e.g. to map an ingress BH RLC channel from a parent/child IAB node to an egress BH RLC channel in the link towards a child/parent IAB node. In particular, one BH RLC channel may convey end-user traffic for several dedicated radio bearers (DRBs) and for different UEs which could be connected to different IAB nodes in the network. In 3GPP two possible configuration of BH RLC channel has been provided, i.e. a 1:1 mapping between BH RLC channel and a specific user's DRB, a N:1 bearer mapping where N DRBs possibly associated to different UEs are mapped to 1 BH RLC channel. The first case can be easily handled by the IAB node's scheduler since there is a 1:1 mapping between the QoS requirements of the BH RLC channel and the QoS requirements of the associated DRB. However, this type of 1:1 configuration is not easily scalable in case an IAB node is serving many UEs/DRBs. On the other hand, the N:1 configuration is more flexible/scalable, but ensuring fairness across the various served BH RLC channels might be trickier, because the amount of DRBs/UEs served by a given BH RLC channel might be different from the amount of DRBs/UEs served by another BH RLC channel.

On the IAB-node, the BAP sublayer contains one BAP entity at the MT function and a separate co-located BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

FIG. 4 shows one example of the functional view of the BAP sublayer. This functional view should not restrict implementation. The figure is based on the radio interface protocol architecture defined in TS 38.300. In the example of FIG. 4, the receiving part on the BAP entity delivers BAP Protocol Data units (PDUs) to the transmitting part on the collocated BAP entity. Alternatively, the receiving part may deliver BAP Service Data units (SDUs) to the collocated transmitting part. When passing BAP SDUs, the receiving part removes the BAP header, and the transmitting part adds the BAP header with the same BAP routing ID as carried on the BAP PDU header prior to removal. Passing BAP SDUs in this manner is therefore functionally equivalent to passing BAP PDUs, in implementation.

The services provided by the BAP sublayer to upper layers are: data transfer.

A BAP sublayer expects the following services from lower layers per RLC entity (for a detailed description see TS 38.322): acknowledged data transfer service; and unacknowledged data transfer service.

The BAP sublayer supports the following functions:

Data transfer;

Determination of BAP destination and path for packets from upper layers;

Determination of egress BH RLC channels for packets routed to next hop;

Routing of packets to next hop;

Differentiating traffic to be delivered to upper layers from traffic to be delivered to egress link;

Flow control feedback and polling signaling.

Therefore, the BAP layer is fundamental to determine how to route a received packet. For the downstream that implies determining whether the packet has reached its final destination, in which case the packet will be transmitted to UEs that are connected to this IAB node as access node, or to forward it to another IAB node in the right path. In the first case, the BAP layer passes the packet to higher layers in the IAB node which are in charge of mapping the packet to the various QoS flows and hence DRBs which are included in the packet. In the second case instead, the BAP layer determines the proper egress BH RLC channel on the basis of the BAP destination, path identities/identifiers (IDs) and ingress BH RLC channel. Same as the above applies also to the upstream, with the only difference that the final destination is always one specific donor DU/CU.

In order to achieve the above tasks, the BAP layer of the IAB node has to be configured with a routing table mapping ingress RLC channels to egress RLC channels which may be different depending on the specific BAP destination and path of the packet. Hence, the BAP destination and path ID are included in the header of the BAP packet so that the BAP layer can determine where to forward the packet.

Additionally, the BAP layer has an important role in the hop-by-hop flow control. In particular a child node can inform the parent node about possible congestions experienced locally at the child node, so that the parent node can throttle the traffic towards the child node. The parent node can also use the BAP layer to inform the child node in case of RLF issues experienced by the parent, so that the child can possibly reestablish its connection to another parent node.

Topology adaptation in IAB networks may be needed for various reasons, e.g. changes in the radio conditions, changes to the load under the serving CU, radio link failures, etc. The consequence of an IAB topology adaptation could be that an IAB node is migrated (i.e. handed-over) to a new parent (which can be controlled by the same or different CU) or that some traffic currently served by such IAB node is offloaded via a new route (which can be controlled by the same or different CU). If the new parent of the IAB node is under the same CU or a different CU, the migration is either an intra-donor and inter-donor migration, respectively (herein also referred to as the intra-CU and inter-CU migration).

FIG. 5 shows an example of some possible IAB-node migration (i.e. topology adaptation) cases listed in the order of complexity.

Intra-CU Case (A): In this case the IAB-node (E) along with it serving UEs is moved to a new parent node (IAB-node (B)) under the same donor-DU (1). The successful intra-donor DU migration requires establishing UE context setup for the IAB-node (E) MT in the DU of the new parent node (IAB-node (B)), updating routing tables of IAB nodes along the path to IAB-node (E) and allocating resources on the new path. The IP address for IAB-node (E) will not change, while the F1-U tunnel/connection between donor-CU (1) and IAB-node (E) DU will be redirected through IAB-node (B).

Intra-CU Case (B): The procedural requirements/complexity of this case is the same as that of Case (A). Also, since the new IAB-donor DU (i.e., DU (2)) is connected to the same L2 network, the IAB-node (E) can use the same IP address under the new donor DU. However, the new donor DU (i.e. DU(2)) will need to inform the network using IAB-node (E) L2 address in order to get/keep the same IP address for IAB-node (E) by employing some mechanisms, such as Address Resolution Protocol (ARP).

Intra-CU Case (C): This case is more complex than Case (A) as it also needs allocation of a new IP address for IAB-node (E). In case IPsec is used for securing the F1-U tunnel/connection between the Donor-CU (1) and IAB-node (E) DU, then it might be possible to use existing the IP address along the path segment between the Donor-CU (1) and SeGW, and a new IP address for the IPsec tunnel between SeGW and IAB-node (E) DU.

Inter-CU Case (D): This is the most complicated case in terms of procedural requirements and may need new specification procedures (such as enhancement of RRC, F1AP, XnAP, Ng signaling) that are beyond the scope of 3GPP Rel-16.

3GPP Rel-16 specifications only consider procedures for intra-CU migration. Inter-CU migration requires new signalling procedures between source and target CUs in order to migrate the IAB node contexts and its traffic to the target CU, such that the IAB node operations can continue in the target CU and the QoS is not degraded. Inter-CU migration will be specified in the context of 3GPP Rel-17.

Inter-CU Migration in Rel-17

As mentioned above, 3GPP Rel-16 has standardized only intra-CU topology adaptation procedure. Considering that inter-CU migration will be an important feature of IAB Rel-17, enhancements to existing procedure are required for reducing service interruption (due to IAB-node migration) and signaling load.

Some use cases for inter-donor topology adaptation (e.g. inter-CU migration) are:

Inter-donor load balancing: One possible scenario is that a link between an IAB node and its parent node becomes congested. In this case, the traffic of an entire network branch, below and including the said IAB node (herein referred to as the top-level IAB node) may be redirected to reach the top-level node via another route. If the new route for the offloaded traffic includes traversing the network under another donor before reaching the top-level node, the scenario is an inter-donor routing one. The offloaded traffic may include both the traffic terminated at the top-level IAB node and its served UEs, or the traffic traversing the top-level IAB node, and terminated at its descendant IAB nodes and UEs. In this case, the MT of the top-level IAB node (i.e. top-level IAB-MT) may establish an RRC connection to another donor (thus releasing its RRC connection to the old donor), and the traffic towards this node and its descendant devices is now sent via the new donor.

Inter-donor RLF recovery: where an IAB node experiencing a Radio link failure (RLF) on its parent link attempts RRC reestablishment towards a new parent under another donor (this node can also be referred to as the top-level IAB node). According to 3GPP agreements, if the descendant IAB nodes and UEs of the top-level node "follow" to the new donor, the parent-child relations are retained after the top-level node connects to another donor.

The above cases assume that the top-level node's IAB-MT can connect to only one donor at a time. However, Rel-17 work will also consider the case where the top-level IAB-MT can simultaneously connect to two donors, in which case:

For load balancing, the traffic reaching the top-level IAB node via one leg may be offloaded to reach the top-level IAB node (and, potentially, its descendant nodes) via the other leg that the node established to another donor.

For RLF recovery, the traffic reaching the top-level IAB node via the broken leg can be redirected to reach the node via the "good" leg, towards the other donor.

With respect to inter-donor topology adaptation, the 3GPP Rel-17 specifications will allow two alternatives:

Proxy-based solution: assuming that top-level IAB-MT is capable of connecting to only one donor at a time, the top-level IAB-MT migrates to a new donor, while the F1 and RRC connections of its collocated IAB-DU and all the descendant IAB-MTs, IAB-DUs and UEs remain anchored at the old donor, even after inter-donor topology adaptation.

The proxy-based solution is also applicable in case when top-level IAB-MT is simultaneously connected to two donors. In this case, some or all of the traffic traversing/terminating at the top-level node is offloaded via the leg towards the 'other' donor.

Full migration-based solution, where all the F1 and RRC connections of the top-level node and all its descendant devices and UEs are migrated to the new donor.

The details of both solutions are currently under discussion in 3GPP.

Details and an Example of Proxy-Based Solution for Inter-CU Migration

One drawback of the full migration-based solution for inter-CU migration is that a new F1 connection is set up from IAB-node E to the new CU (i.e. CU(2)) and the old F1 connection to the old CU (i.e. CU(1)) is released (see FIG. 5).

Releasing and relocating the F1 connection will impact all UEs (i.e., UEc, UEd, and UEe) and any descendant IAB nodes (and their served UEs) by causing:

1) service interruption for the UEs and IAB nodes served by the top-level IAB node (i.e., IAB-node E) since these UEs may need to re-establish their connection or to perform handover operation (even if they remain under the same IAB node, as 3GPP security principles mandate to perform key refresh whenever the serving CU/gNB is changed (e.g., at handover or reestablishment), i.e., RRC reconfiguration with reconfiguration-WithSync has to be sent to each UE).

2) a signaling storm, since a large number of UEs, IAB-MTs and IAB-DUs have to perform re-establishment or handover at the same time.

In addition, it is preferred that any reconfiguration of the descendant nodes of the top-level node is avoided. This means that the descendant nodes should preferably be unaware of the fact that the traffic is proxied via CU_2.

To address the above problems, a proxy-based mechanism has been proposed where the inter-CU migration is done without handing over the UEs or IAB nodes directly or indirectly being served by the top-level IAB node, thereby making the handover of the directly and indirectly served UEs transparent to the target CU. In particular, only the RRC connection of the top-level IAB node is migrated to the target CU, while the CU-side termination of its F1 connec-tion as well as the CU-side terminations of the F1 and RRC connections of its directly and indirectly served IAB nodes and UEs are kept at the source CU—in this case, the target CU serves as the proxy for these F1 and RRC connections that are kept at the source CU. Hence in this case, the target CU just needs to ensure that the ancestor node of the top-level IAB node is properly configured to handle the traffic from the top-level node to the target donor, and from the target donor to the top-level node. Meanwhile, the configuration of the descendant IAB node of the top-level node is still under the control of the source donor. Hence, in this case the target donor does not need to know the network topology and the QoS requirements or the configuration of the descendant IAB nodes and UEs.

FIG. 6 illustrates the signalling connections when the F1 connections are maintained in the CU-1, while FIG. 7 highlights how the F1-U is tunnelled over the Xn and then transparently forwarded to the IAB donor-DU-2 after the IAB node is migrated to the target donor CU (i.e. CU_2).

An Example of Proxy-Based Solution for Inter-Donor Load Balancing

FIG. 8 illustrates an example of inter-donor load balanc-ing scenario, involving IAB3 and its descendant node IAB4 and the UEs that these two IAB nodes are serving.

Applied to the scenario in FIG. 8, the proxy-based solu-tion works as follows:

IAB3-MT changes its RRC connection (i.e., association) from CU_1 to CU_2.

Meanwhile, the RRC connections of IAB4-MT and all the UEs served by IAB3 and IAB4, as well as the F1 connections of IAB3-DU and IAB4-DU would remain anchored at CU_1 (i.e. they are not moved to CU_2), whereas the corresponding traffic of these connections is sent to and from the IAB3/IAB4 and their served UEs by using a path via CU_2.

So, the traffic previously sent from the source donor (i.e., CU_1) to the top-level IAB node (IAB3) and its descendants (e.g. IAB4) is offloaded (i.e. proxied) via CU_2. In particu-lar, the old traffic path from CU_1 to IAB4, i.e. CU_1-Donor DU_1-IAB2-IAB3-IAB4 is, for load balancing purposes, changed to Donor 1-Donor 2-IAB5-IAB3-IAB4.

Load Balancing

When the CU determines that load balancing is needed, the CU starts the procedure requesting a second CU for resources to offload part of the traffic of a certain (i.e. top-level) IAB node. The CUs will negotiate the configu-ration and the second CU will prepare the configuration to apply in the second protocol stack of the IAB-MT, the RLC backhaul channel(s), BAP address(es), etc.

The top-level IAB-MT will use routing rules provided by the CU to route certain traffic to the first or the second CU. In the DL, the IAB-MT will translate the BAP addresses from the second CU to the BAP addresses from the first CU to reach the nodes under the control of the first CU.

All this means that only the top-level IAB node (i.e. the IAB node from which traffic is offloaded) is affected and no other node or UE is aware of this situation. All this proce-dure can be performed with current signaling, with some minor changes.

Inter-Donor Topological Redundancy

RAN3 has agreed the following two scenarios for the inter-donor topology redundancy (see FIG. 9):

Scenario 1: the IAB (IAB3) is multi-connected with 2 Donors.

Scenario 2: the IAB (IAB4)'s parent/ancestor node (IAB3) is multi-connected with 2 Donors.

In these two scenarios, RAN3 uses the following termi-nologies:

Boundary IAB node: the node (IAB 3) accesses two different parent nodes (IAB1 and IAB2) connected to two different donor CUs, respectively;

Descendant IAB node: the node(s) accessing the network via boundary IAB node, and each node is single-connected to its parent node, e.g., IAB4 in scenario 2;

F1-termination node: the donor CU terminating F1 interface of the boundary IAB node and descendant node(s);

Non-F1-termination node: the CU with donor functionalities, which does not terminate F1 interface of the boundary IAB node and descendant node(s).

SUMMARY

There currently exist certain challenge(s). As explained above, in the Inter-CU migration case, topology adaptation can be accomplished by using the proxy-based solution, where, with respect to the scenario shown in FIG. 8, the top-level IAB3-MT changes its RRC connection (i.e., association) from CU_1 to CU_2. Meanwhile, the RRC connections of IAB4-MT and all the UEs served by IAB3 and IAB4, as well as the F1 connections of IAB3-DU and IAB4-DU remain anchored at CU_1, whereas the corresponding traffic of these connections would be sent to/from the IAB3/IAB4 and their served UEs by using the new path via Donor DU2.

Nevertheless, the following should be considered:

It is expected that the need for offloading traffic to another donor would be only temporary (e.g. during peak hours of the day), and that, after a while, the traffic can be returned to the network under the first donor.

It is also expected that millimeter wave links will generally be quite stable, with rare and short interruptions. In that sense, in case topology adaptation was caused by inter-donor RLF recovery, it is expected that the RLF scenarios will be short-lived, i.e. that it will be possible to establish (again) a stable link towards the (old) parent under the old donor quite soon.

For the above reasons, and especially since the traffic proxying is not expected to be necessary for long periods of time, it is crucial to minimize the amount of reconfigurations of the top-level IAB node and its descendants in the proxy-based approach. In general, it is preferred that none of the descendants of the top-level node are reconfigured when proxying is configured.

One type of reconfiguration that would be helpful to avoid is the reconfiguration of Internet Protocol (IP) addresses assigned to the descendants of the top-level node, herein also referred to as the boundary node. Note that since the top-level IAB-MT does migrate to CU_2, it needs to be assigned new IP addresses. However, according to the 3GPP Rel-16 specifications, all DL/UL traffic traversing a Donor DU must have a destination/source IP address from the IP domain of that Donor DU. This means that, if the current 3GPP specifications were followed, even in the proxy-based solution, since the proxied traffic is traversing the Donor DU2, the change of IP addresses of descendant IAB nodes of the boundary node would be mandatory. This, in turn, means that it would not be possible to avoid reconfigurations of descendant nodes of the boundary node.

For the proxy-based solutions, it is unclear how to avoid changing the IP addresses of the descendants of the top-level IAB node when the top-level IAB-MT migrates to CU_2.

Certain aspects of the disclosure and their embodiments may provide solutions to these or other challenges.

The present disclosure proposes methods to avoid reconfiguration of IP addresses of boundary node's descendants in proxy-based inter-donor topology adaptation. For example, a method may comprise: receiving an UL packet, destined to the second donor DU, from an IAB node, which has a communication path to the second donor DU that is unavailable; appending a header pertaining to a tunnel to the UL packet; and sending the UL packet through the tunnel to the second donor DU, the tunnel being established between the first donor DU and the second donor DU. Another method may comprise: receiving an UL packet from the first donor DU, via a tunnel being established between the first donor DU and the second donor DU, the UL packet having a header pertaining to the tunnel and destined to the second donor DU and originated from an IAB node which has a communication path to the second donor DU that is unavailable; removing the header pertaining to the tunnel from the UL packet; and sending the UL packet to a network node. Another method may comprise: receiving a DL packet, from a centralized unit (CU); appending a header pertaining a tunnel to the DL packet; and sending the DL packet with the appended header to the second donor DU via the tunnel, the tunnel being established between the first donor DU and the second donor DU.

More specifically, the methods include:

creating direct tunnels, e.g. GTP tunnels, between the source and target donor DUs belonging to the source and target donors, for carrying the proxied traffic;

At the source donor DU, encapsulating the BAP packets into another BAP header and a GTP header and sending them to the target donor DU;

Removing the GTP header at the target donor DU and forwarding the packet with double BAP header to the boundary node;

Removing, at the boundary node, the second BAP header and forwarding the packet to the descendant nodes or its served UEs.

Certain embodiments may provide one or more of the following technical advantage(s). Solutions herein proposed enable inter-donor traffic load balancing in IAB networks (where the traffic between a donor and an IAB node traverses the network under another donor), without affecting or reconfiguring the IP addresses of the descendants of the top-level IAB node, which, in turn, simplifies and accelerates the load balancing procedure.

BRIEF DESCRIPTION OF THE DRAWINGS

Some of the embodiments contemplated herein will now be described more fully with reference to the accompanying drawings.

FIG. 9 illustrates scenarios for inter-donor topological redundancy.

FIG. 13 illustrates an example of a packet header at step 9 for the downlink traffic.

FIG. 14 illustrates a flow chart of a method in a donor DU, according to an embodiment.

FIG. 15 illustrates a flow chart of a method in a donor DU, according to an embodiment.

FIG. 16 illustrates a flow chart of a method in a donor DU, according to an embodiment.

DETAILED DESCRIPTION

Figure 1:
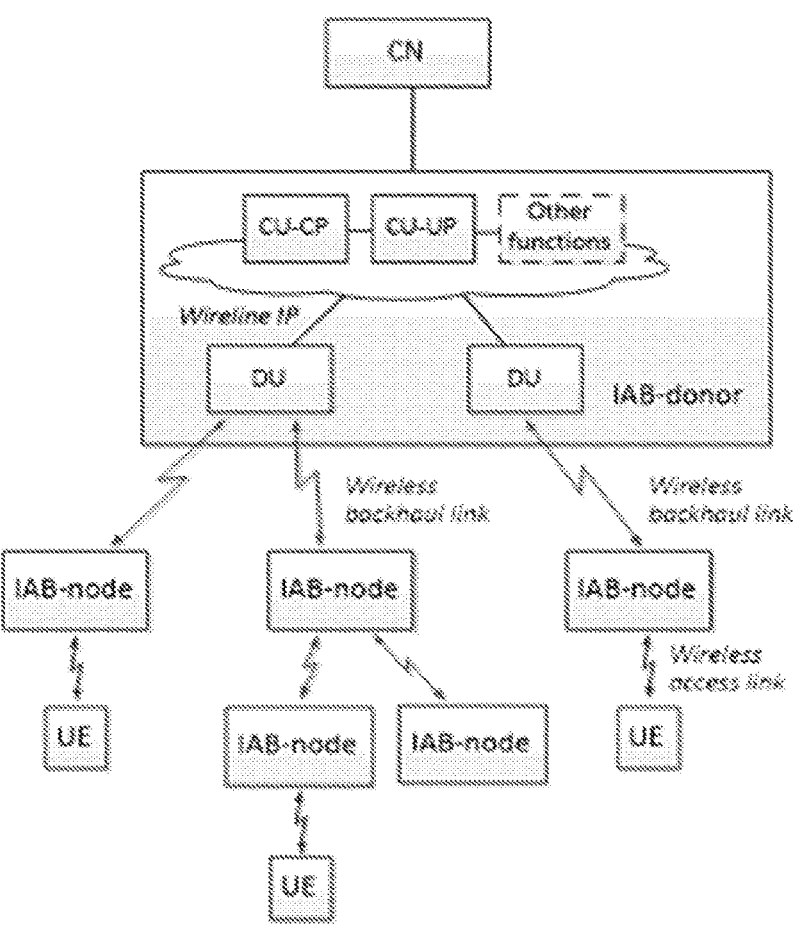
FIG. 1 illustrates a reference diagram for IAB-architectures (TR 38.874).
Figure 2:
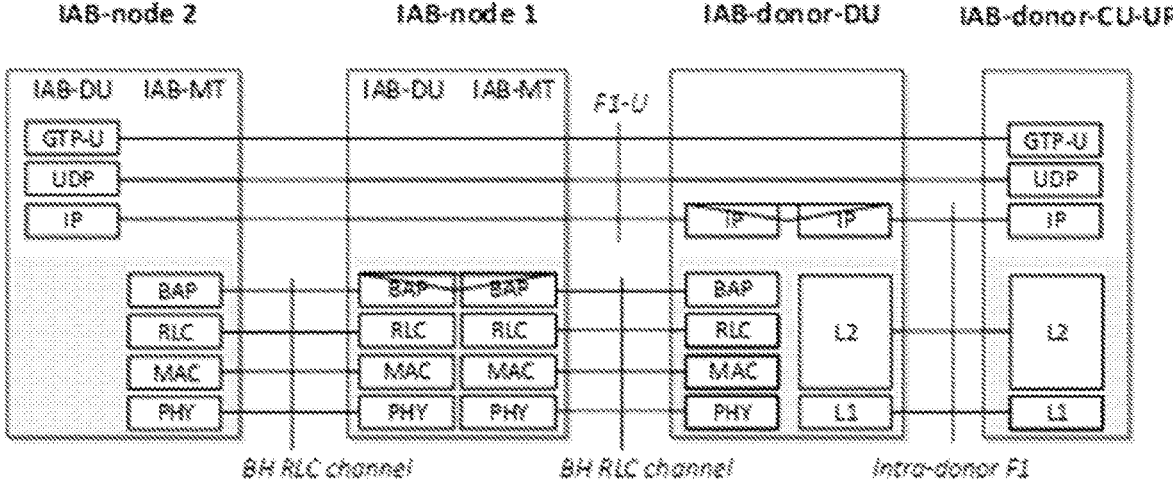
FIG. 2 illustrates a Baseline User Plane (UP) Protocol stack for IAB in rel-16.
Figure 3:
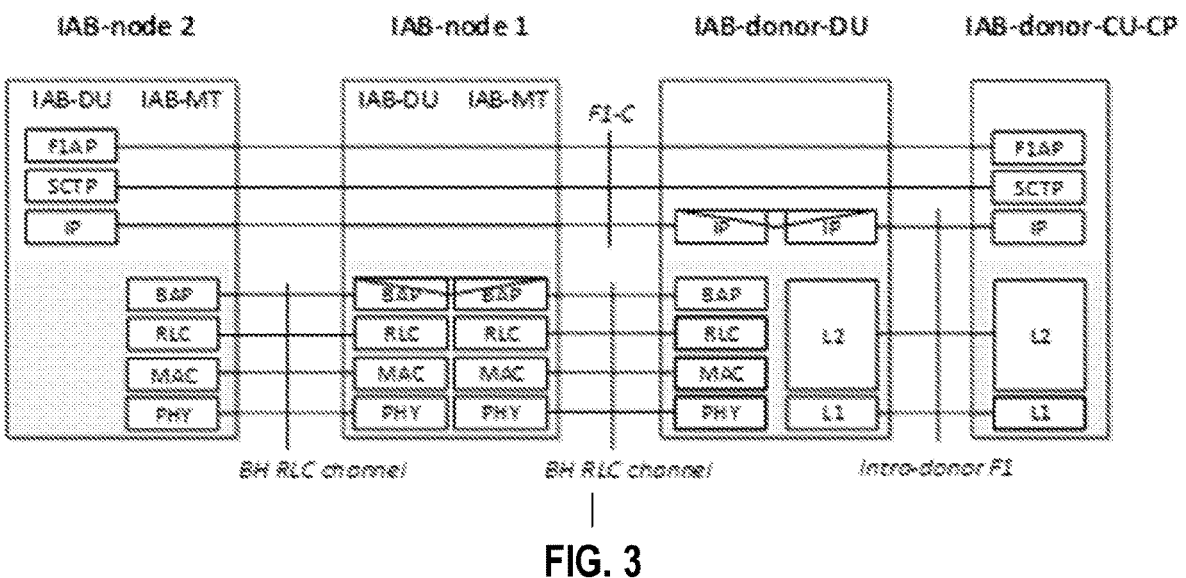
FIG. 3 illustrates a Baseline control plane (CP) Protocol stack for IAB in rel-16.
Figure 4:
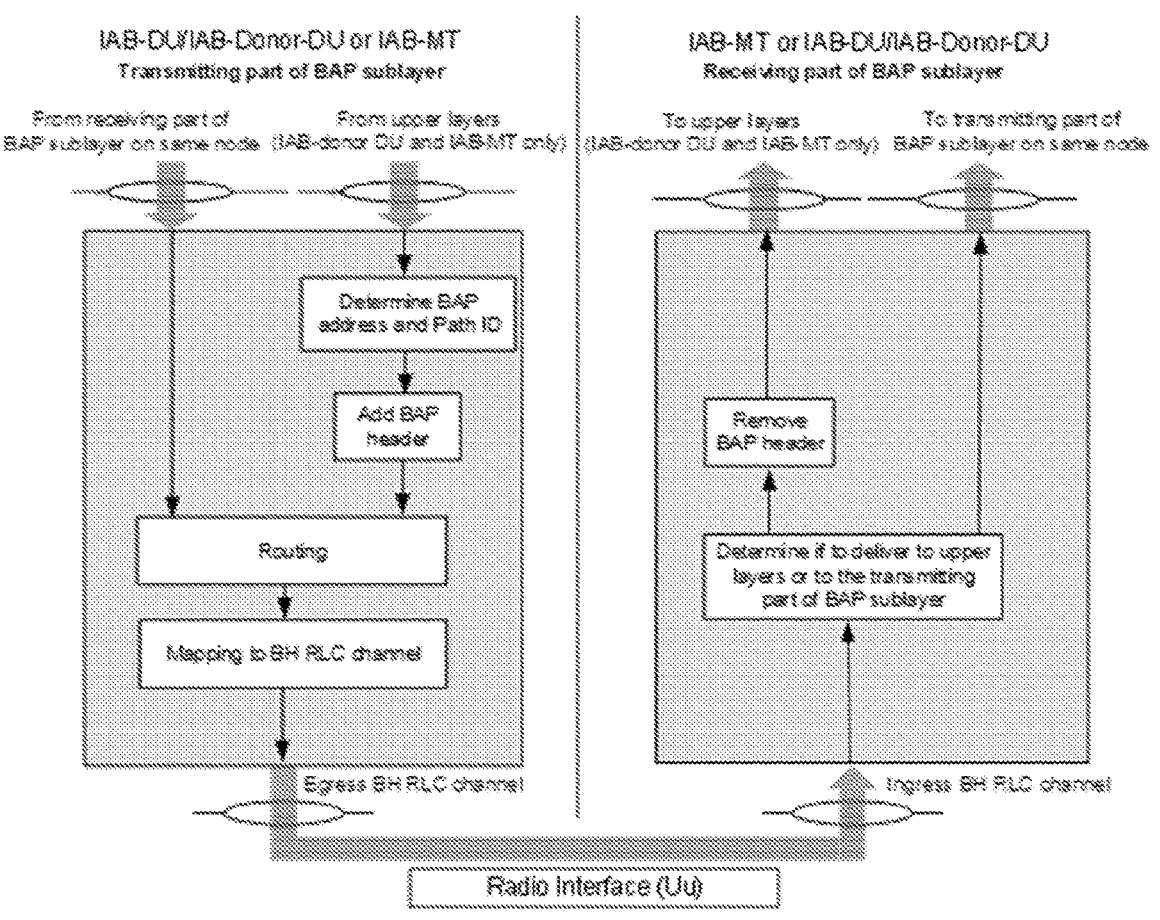
FIG. 4 illustrates an example of a functional view of BAP sublayer.
Figure 5:
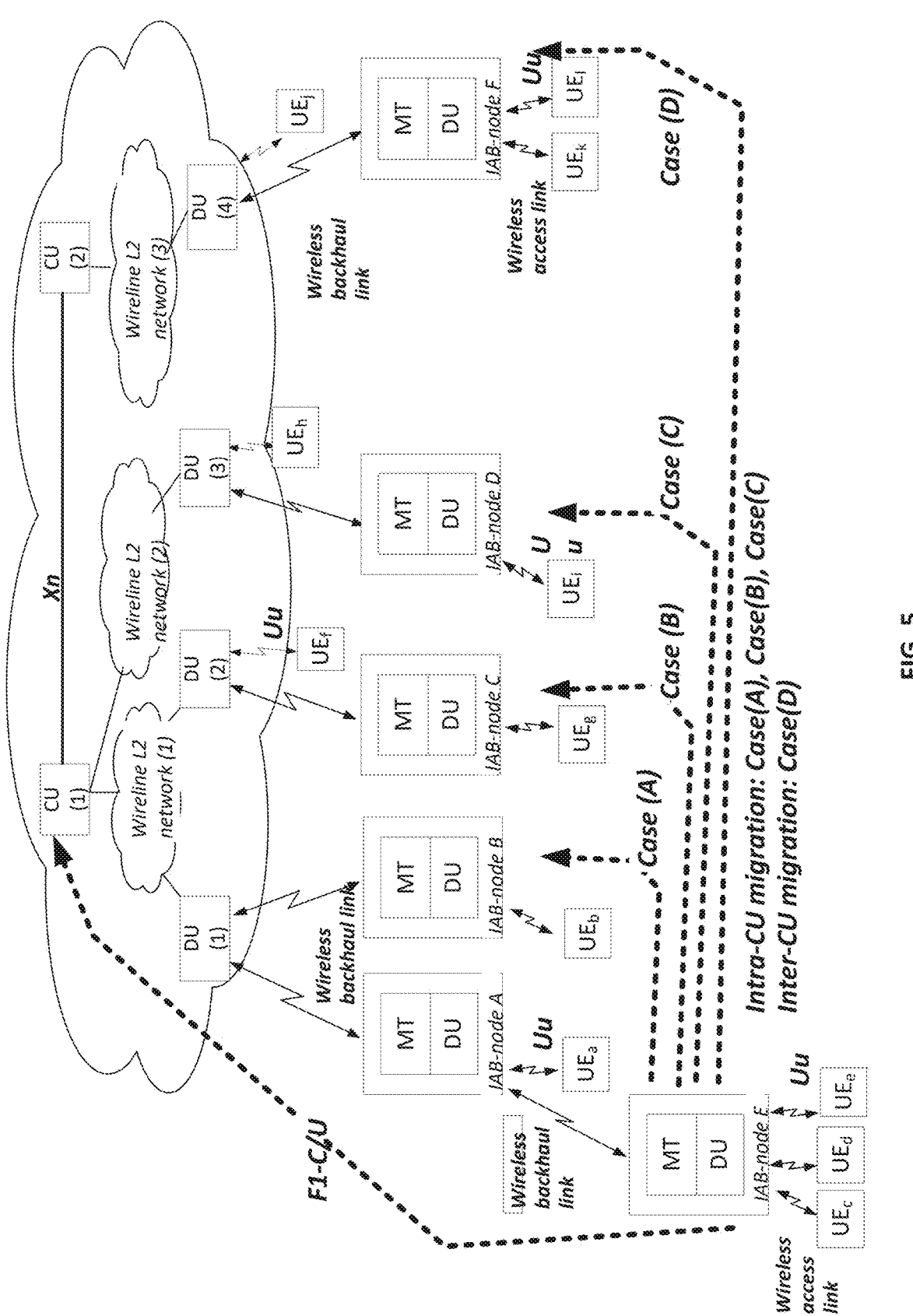
FIG. 5 shows an example of different possible scenarios for IAB topology adaptation.
Figure 6:
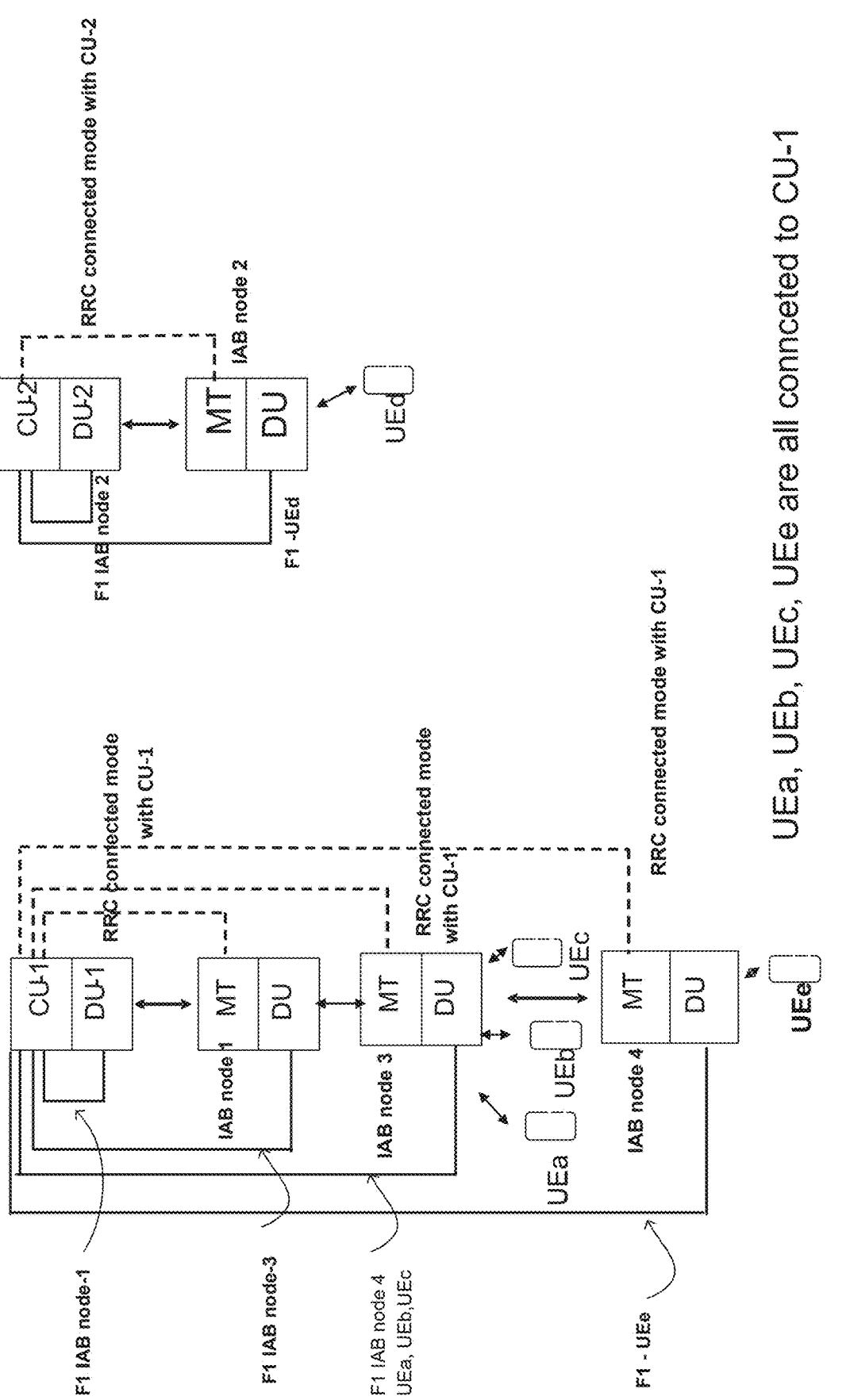
FIG. 6 illustrates an example of a signal flow before IAB-node 3 migration.
Figure 7:
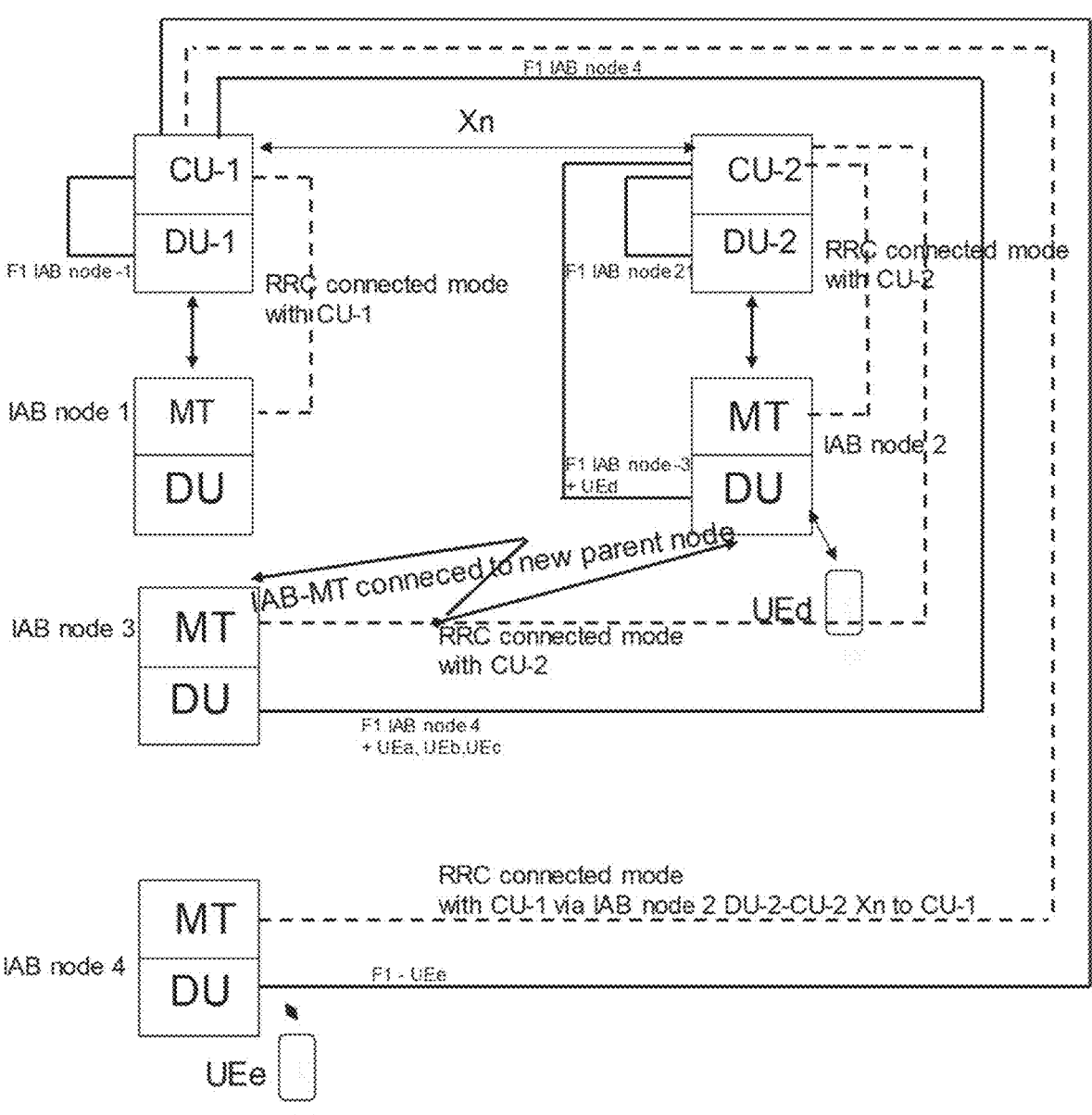
FIG. 7 illustrates another example of signal flow after IAB-node 3 migration.

Some of the embodiments contemplated herein will now be described more fully with reference to the accompanying drawings. Embodiments are provided by way of example to convey the scope of the subject matter to those skilled in the art.

Disclaimers

Although this disclosure refers to IAB networks, some embodiments apply to UEs, regardless of whether they are served by an IAB network or a "non-IAB" RAN node.

The terms "boundary node" and "top-level node" are used interchangeably.

The terms "inter-donor traffic offloading" and "inter-donor migration" are used interchangeably.

The term "single-connected top-level node" refers to the top-level IAB-MT that can connect to only one donor at a time.

The term "dual-connected top-level node" refers to the top-level IAB-MT that can simultaneously connect to two donors.

The term "descendant node" may refer to both the child node and the child of the child node and so on.

The terms "CU_1", "source donor" and "old donor" are used interchangeably.

The terms "CU_2", "target donor" and "new donor" are used interchangeably.

The terms "Donor DU_1", "source donor DU" and "old donor DU" are used interchangeably.

The terms "Donor DU_2", "target donor DU" and "new donor DU" are used interchangeably.

The term "parent" may refer to an IAB node or an IAB-donor DU.

The terms "migrating IAB node" and "top-level IAB node" are used interchangeably:

In the proxy-based solution for inter-donor topology adaptation, they refer to the IAB-MT of this node (e.g. IAB3-MT in FIG. 8), because, the collocated IAB-DU of the top-level node does not migrate (it maintains the F1 connection to the source donor).

In the full migration-based solution, the entire node and its descendants migrate to another donor.

Some examples of scenarios that this disclosure is based on are given below:

Inter-donor load balancing for a single-connected top-level node (e.g. IAB3-MT for FIG. 8) by using the proxy based solution: here, the traffic carried to/from/via top-level IAB node is taken over by (i.e. proxied) a target donor (e.g. CU_2 in FIG. 8), i.e. the source donor (e.g. CU_1 in FIG. 8) offloads the traffic pertaining to the ingress/egress BH RLC channels between the IAB node and its parent node to the target donor.

Inter-donor load balancing for a dual-connected top-level node (e.g. IAB3-MT for FIG. 8) by using the proxy based solution: here, the traffic carried to/from/via top-level IAB node is taken over by (i.e. proxied) a target donor (load balancing), i.e. the source donor offloads the traffic pertaining to the ingress/egress BH RLC channels between the IAB node and its parent node to the top-level node's leg towards the target donor.

Inter-donor RLF recovery of a single-connected top-level node, caused by RLF on a link to the IAB node's parent, or on a link between the IAB node's parent and parent's parent, where the node (i.e. top-level node) performs reestablishment at a parent under target donor.

Inter-donor RLF recovery of a dual-connected top-level node, caused by RLF on a link to the IAB node's parent, or on a link between the IAB node's parent and parent's parent, where the traffic of the IAB node (i.e. top-level node) is completely moved to the leg of the IAB node towards the target donor.

IAB node handover to another donor.

Local inter-donor rerouting (UL and/or DL), where the newly selected path towards the donor or the destination IAB node leads via another donor.

Any of the example scenarios above, where the full migration-based solution (as described above) is applied (instead of the proxy-based solution).

The top-level IAB node comprises top-level IAB-MT and its collocated IAB-DU (sometimes referred to as the "collocated DU" or the "top-level DU"). Certain aspects of this disclosure refer to the proxy-based solution for inter-donor topology adaptation, and certain refer to the full migration-based solution.

The terms "RRC/F1 connections of descendant devices" refer to the RRC connections of descendant IAB-MTs and UEs with the donor (e.g. source donor), and the F1 connections of the top-level IAB-DU and IAB-DUs of descendant IAB nodes of the top-level IAB node.

Traffic between the CU_1 and the top-level IAB node and/or its descendant nodes (also referred to as the proxied traffic) refers to the traffic between the CU_1 and:

1. the collocated IAB-DU part of the top-level IAB node (since the IAB-MT part of the top-level IAB node has migrated its RRC connection to the new donor), 2. the descendant IAB nodes of the top-level IAB node, and 3. the UEs served by the top-level node and its descendant nodes.

The term "destination is IAB-DU" comprises both the traffic whose final destination is either the IAB-DU or a UE or IAB-MT served by the IAB-DU, and that includes the top-level IAB-DU as well.

The terms "data" and "traffic" refer to both UP, control plane traffic and non-F1 traffic.

The considerations herein are equally applicable for both static and mobile IAB nodes.

In the above, a RAN node, can be any of the following: gNB, eNB, en-gNB, ng-eNB, gNB-CU, gNB-CU-CP, gNB-CU-UP, eNB-CU, eNB-CU-CP, eNB-CU-UP, IAB-node, IAB-donor DU, IAB-donor-CU, IAB-DU, IAB-MT, O-CU, O-CU-CP, O-CU-UP, O-DU, O-RU, O-eNB (where the letter "0" stands for "open").

The terms "old donor" and "CU_1" refer to the donor that has previously offloaded traffic to the "new donor"/"CU_2". In case of inter-donor RLF recovery, the top-level node (e.g. IAB3 in FIG. 8), upon experiencing an RLF towards its parent under CU_1 connects to a new parent under CU_2.

Figure 8:
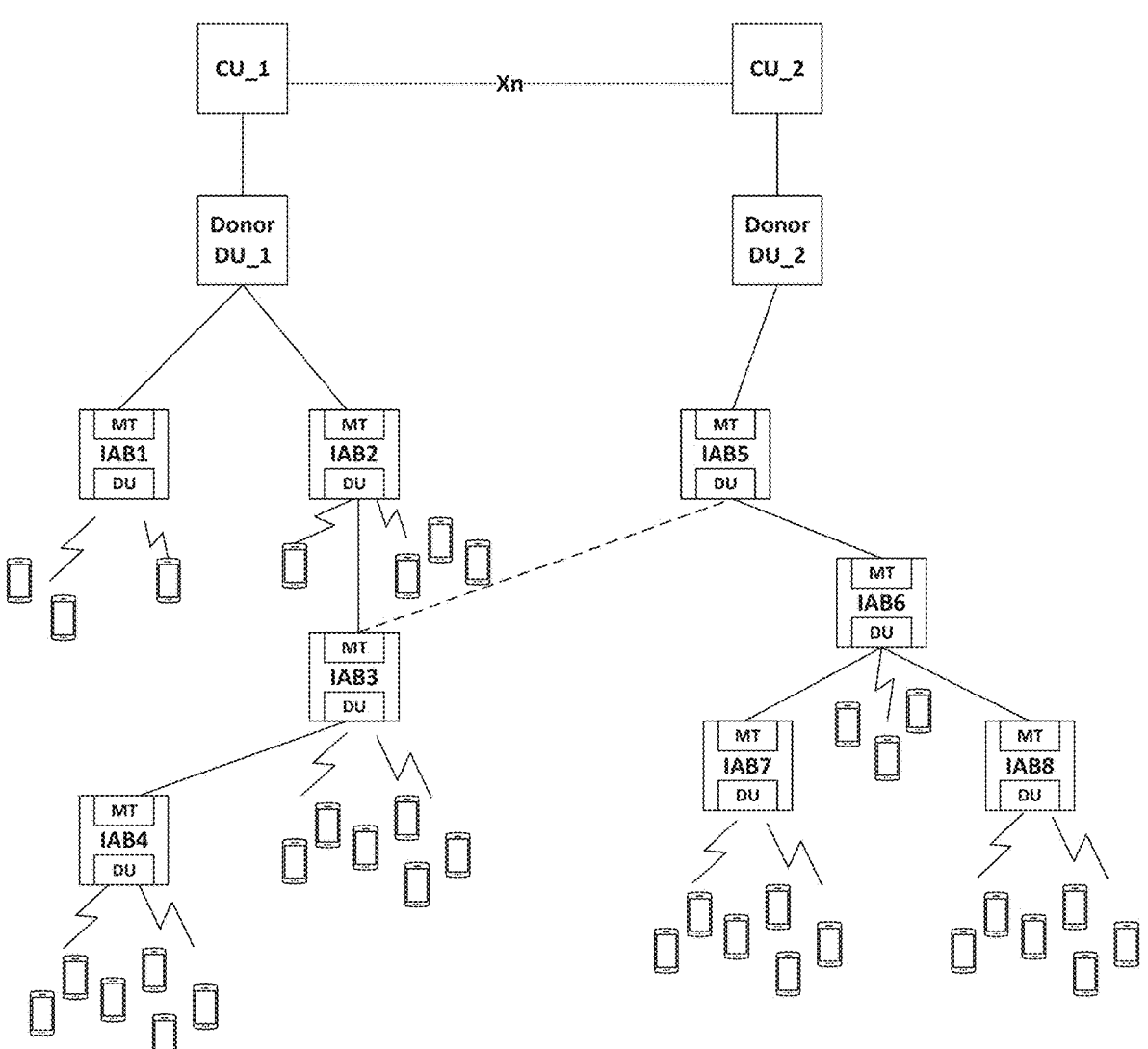
FIG. 8 illustrates an example of inter-donor load balancing scenario, involving IAB3 and its descendant node IAB4 and the UEs that these two IAB nodes are serving.

It is assumed that the proxy-based solution (is used for traffic offloading, and an exemplary solution with reference to the example of inter-donor topology adaptation scenario in FIG. 8 is described.

For example, a method for handling DL traffic in the exemplary scenario of FIG. 8 may comprise the following steps:

Step 1: CU_1 determines that a link towards IAB3 is congested and decides to trigger load balancing, i.e. offloading traffic to/from IAB3 and all its descendants via CU_2. This step may be performed also as a consequence of an RLF experienced by the IAB3 with its parent node under the CU (CU_1), in which case the IAB3 attempts RRC re-establishment to IAB5, and CU_2 contacts CU_1 asking for the context of IAB3 and its descendant devices.

Step 2: CU_1 contacts CU_2 and requests load balancing or routing of all the traffic (in case of RLF of link between IAB3 and its parent under CU_1, i.e. IAB2) via the proxy-based approach. CU_2 accepts the request.

Step 3: based on the number of descendant nodes of IAB3 (e.g. IAB3 has one descendant, IAB4), the corresponding traffic load, topology under the boundary node (IAB3), the BAP routing IDs assigned to these nodes and the boundary node, CU_1 and CU_2 exchange necessary information for the CU_2 to set up backhaul resources between the IAB3 and its new parent, i.e. IAB5, and the corresponding necessary resources to carry this traffic between Donor DU2 and IAB5. For each existing BAP routing ID towards IAB3 and IAB4 used in CU_1 network, CU_2 assigns a corresponding BAP routing ID (herein referred to as the proxy BAP routing ID) to be used for proxying of this traffic through CU_2 network.

NOTE: for the sake of proxying, multiple proxy BAP routing IDs may be needed, each having its original BAP routing ID counterpart.

Step 4: A number of tunnels (e.g. GTP tunnels) between Donor DU1 (DDU1) and Donor DU2 (DDU2) are established for carrying the proxied traffic. The DDU1 may, for example, get the information necessary to set up these GTP tunnels towards DDU2 from CU_1, which obtains the information (info) from CU_2. One example of this information can be the GTP tunnel endpoint ID, IP address of DDU2, etc.

Step 5: CU_1 configures DDU1 with the information necessary for deriving the proxy BAP header (including proxy BAP routing ID) for the traffic to IAB3 or IAB4 that is to be proxied via DDU2.

In legacy Rel-16 specifications, a DDU derives a BAP header for a DL packet based on the destination IP address and/or Differentiated Services Code Point (DSCP)/differentiated services (DS) and/or flow label value in IP packet header. Before proxying was set up, the BAP routing IDs derived for DL traffic to the IAB3 and its descendant nodes were pertaining to CU_1 network (herein referred to as the original BAP routing ID), and packets were sent from DDU1 to IAB2 to IAB3 and so on. But, for the sake of proxying, DDU1 is configured by CU_1 (based upon coordination with CU_2 in Step 3), to derive BAP routing IDs for DL packets pertaining to CU_2 network (i.e. proxy BAP routing ID) that will be sent to IAB3 and IAB4 via DDU2 and IAB5.

In one variant, DDU1 is configured to first derive BAP routing ID from CU_1 Network (i.e. the original BAP routing ID, based on the destination IP address and/or DSCP/DS and/or flow label value in IP packet header) and then replace this original BAP routing ID with its proxy BAP routing ID counterpart.

The CU_1 may provide for each IP header information element (e.g. destination IP address and/or DSCP/DS and/or flow label value in IP packet header) a BAP routing ID that is normally used by the DDU1 when transmitting traffic to IAB nodes under the CU_1, and/or the proxy BAP routing ID that should be used when transmitting the traffic to the DDU2 in the proxy-based approach. Hence in case the DDU1 detects traffic having certain IP header information, it may determine whether such IP packet should be transmitted to the donor DDU2 or to child IAB nodes under the CU_1, e.g. if the IP header of the received packet has certain characteristics, i.e. IP header information, for which there is only a corresponding BAP routing ID configured by the CU_1, then the packet is transmitted by the DDU1 to a DDU1's child node, otherwise if for the detected IP information of the IP packet there is also proxy BAP routing ID, then the DDU1 derives that such IP packet to be transmitted in the DL needs to be proxied to the IAB3 via CU_2 network (e.g. via DDU2) and it appends to the concerned packet the proxy BAP routing ID, as per the method in the following steps. Additionally, in this latter case (i.e. when both the BAP routing and the proxy BAP routing ID) the DDU1 will ignore the BH RLC channel configuration since the packet will not be transmitted via the BH in any BH RLC channel to the child node within the CU_1 network. This configuration may also be used by the CU_1 to configure the DDU1 such that all packets arriving in the DL from specific sources, e.g. certain BH RLC channels or routes, applies the proxy BAP routing ID.

Figure 10:
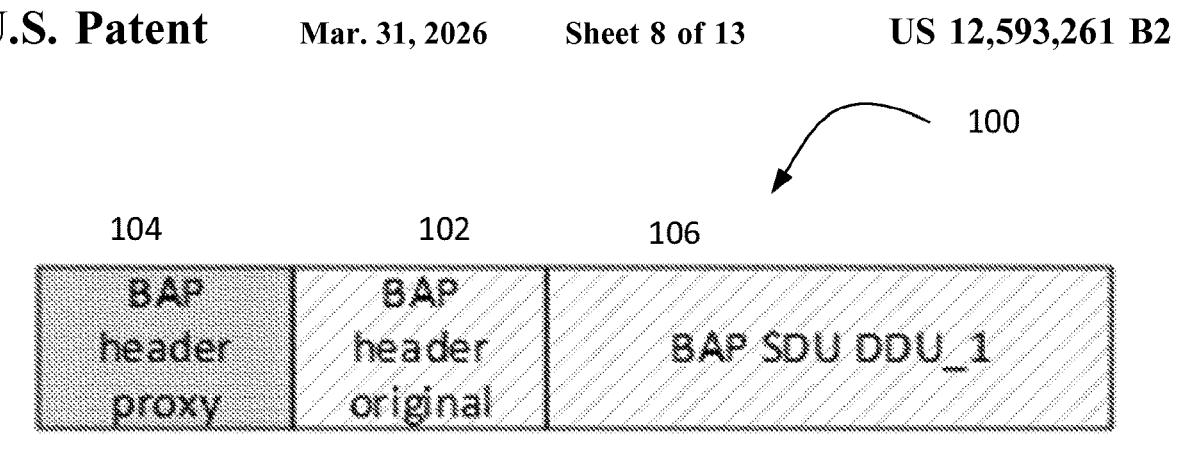
FIG. 10 shows an exemplary packet header at step 6 for the DL traffic, according to an embodiment.

Step 6: For a DL packet to be proxied to IAB3 via CU_2 network, DDU1 derives the original BAP routing ID and the proxy BAP routing ID, e.g. from the methods disclosed in step 5. The original BAP header is first appended, then the proxy BAP header. The BAP header proxy may contain an explicit or implicit flag for the destination node to indicate that there is an inner BAP header, i.e. the original BAP header (herein referred to as BAP header original). This flag may be, for instance, an explicit bit in the BAP header, a specific BAP routing ID used for this purpose, a combination of those, or other field with this specific purpose. This indication or other indication could be also used to indicate the type of BAP header format in the BAP header original. An example of a proxied DL BAP packet 100 as generated in step 6 is given in FIG. 10. The packet 100 has a BAP header proxy 104 appended to a BAP header original 102 appended to the payload containing the packet BAP SDU of DDU1.

Figure 11:
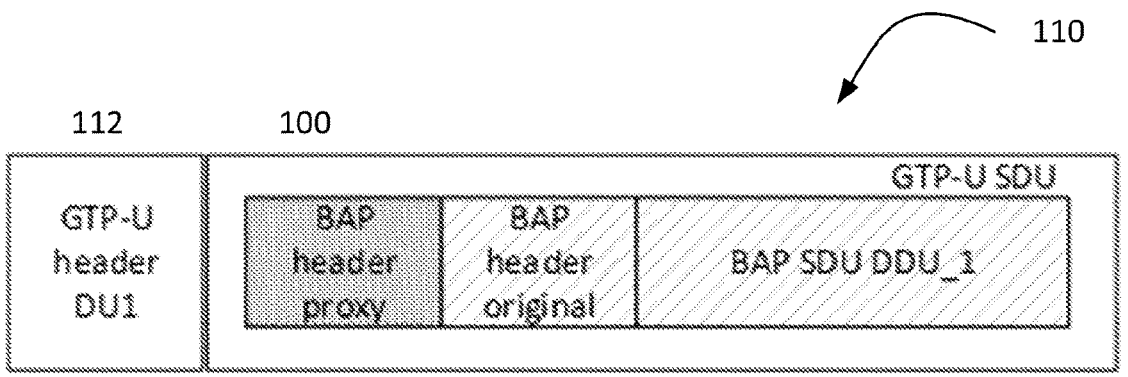
FIG. 11 illustrates an example of a packet header at step 7 for the downlink traffic.

Step 7: The DDU1 encapsulates the BAP packet 100 into a GTP header and sends it to DDU2 via one of the GTP tunnels set up in Step 4. FIG. 11 shows an example of such a packet. This packet 110 comprises the GTP header 112 appended to the BAP packet 100. The payload of packet 110 is referred to as the payload called GTP-U SDU. The payload comprises the BAP packet 100, which includes the BAP header proxy, the BAP header original and the BAP SDU.

Figure 12:
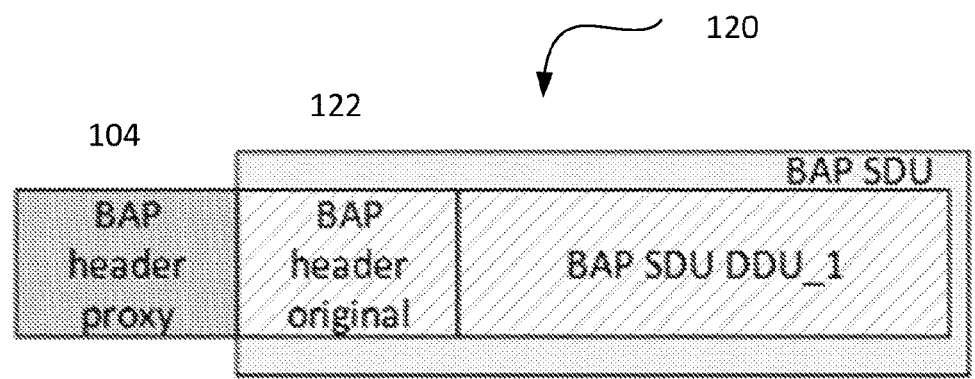
FIG. 12 illustrates an example of a packet header at step 8 for the downlink traffic.

Step 8: DDU2 receives the packet 110, removes the GTP header 112 and forwards the BAP packet to IAB5 which forwards it to IAB3. From a protocol point of view, the IAB nodes belonging to CU_2 will look to the BAP header proxy and will perform routing and other procedures based on the information contained in the BAP header proxy. For these nodes, the rest of the data is considered as a BAP SDU. FIG. 12 illustrates an example of a packet 120, from which the GTP header 112 is removed. Then, packet 120 has a BAP header proxy 104, and a payload 122, which comprises the BAP header original (102) and the BAP SDU DDU1.

Step 9: When the packet 120 reaches its end destination, i.e. IAB3, based on the proxy BAP header proxy 104, IAB3 learns whether there is an inner BAP header 102 or not based on the indications in Step 6. In the case that there is an inner BAP header 102, IAB3 removes the outer BAP header 122 and, based on the BAP routing ID in the inner header 102, forwards the packet 120 to IAB4 or processes it if it is the destination of the packet 120. FIG. 15 illustrates an example of a packet 130 with an inner BAP header (original BAP header) 102 and a payload comprising the BAP SDU DDU1 106.

In one variant pertaining to Steps 6 and 9, instead of appending both the original and proxy BAP header to the DL packet, the DDU1 appends only the proxy BAP header. In that case, CU_1 configures IAB3 (e.g. via F1 signalling) how to overwrite the proxy BAP header with its original BAP header counterpart, before forwarding the packet to its descendants. The BAP header may still carry an implicit or explicit flag to indicate whether the IAB needs to replace the BAP header for another BAP header or replace some of the fields of the BAP header. Alternatively, the CU_1 may indicate to the IAB node that the BAP header of all packets coming from specific sources need to be replaced or, one or more fields in the BAP header need to be replaced. Also, tunnels other than GTP tunnels can be also used.

For the UL traffic, a method for handling UL traffic in the exemplary scenario of FIG. 8 may comprise the following steps:

Step 1: CU_1 in conjunction with DDU1, based on the information about proxy BAP routing IDs received from CU_2, configures the boundary node how to derive the proxy BAP header for an UL packet.

Step 2: IAB node from which the UL packet originates or the IAB node serving the UE from which the packet originates assembles the original BAP header and forwards it towards DDU2 (e.g. packet 130).

Step 3: Boundary node receives an UL packet, appends the proxy header and sends the packet towards DDU2 (e.g. packet 100).

Step 4: When DDU2 receives the packet, it strips the proxy BAP header, encapsulates the BAP packet (which now only has the original BAP header) into a GTP header and sends it via GTP tunnel to DDU1.

Step 5: DDU1 strips the original BAP header and sends the packet to CU_1 or to another network entity.

Reciprocally to step 5 of the method for DL traffic, the DDU2 looks at the source IP address of the packets when deciding which packets should go into the tunnel in step 5 of the method for UL traffic. Indeed, in step 5 of the method for UL traffic, when the BAP header is removed, what remains is the IP header (and the payload of whatever data is encapsulated within). This means that DDU2 has access to the IP header and can look at the source IP address before the GTP header is appended to the packet. Furthermore, a GTP tunnel is an IP tunnel, one may implicitly conclude that the tunnel selection is done based on IP addresses.

Similar to the DL case, the boundary node can be configured by CU_1 (e.g. configured via F1 signalling) to, instead of appending the proxy BAP header to UL packets, overwrite the original BAP header with the proxy header. In this case, either DDU2 or DDU1 can be configured to remove the BAP header of the UL packet before forwarding the packet to CU_1 or another network entity.

NOTE: The above solution is also applicable in case of topological redundancy, i.e. a dual-connected top-level node. Indeed, the fact that the top-level node is able to simultaneously connect to two donors can be used to offload the traffic to/from/via top-level node from a congested leg towards a donor to an uncongested leg towards another donor. This effectively means that there would be no need for migrating either the top-level node or its descendants between donors, i.e. the proxy-based solution described in the Inter-CU migration case would be applied. The fact that the top-level node is able to simultaneously connect to two donors means that it is possible to offload one part of traffic to/from/via top-level node, rather than the entire traffic, which was the case for a single-connected top-level node.

FIG. 14 is a flow chart of a method 200 performed by a first donor DU node for offloading traffic to a second donor DU, in a proxy-based inter-donor topology adaptation, in an IAB network, for example. The first donor DU may be the target DU (e.g. DU_2 of FIG. 8) and the second donor DU can be a source DU (DU_1 of FIG. 8). This method can be applicable to UL traffic. Method 200 may comprise:

Step 210: receiving an uplink (UL) packet, destined to the second donor DU, from an IAB node, which has a communication path to the second donor DU that is unavailable;

Step 220: appending a header pertaining to a tunnel to the UL packet; and

Step 230: sending the UL packet through the tunnel to the second donor DU, the tunnel being established between the first donor DU and the second donor DU.

In some examples, the tunnel is a GPRS Tunnelling Protocol (GTP) tunnel. The tunnel can be also any other types of tunnels.

In an example, after receiving the UL packet and before appending the header pertaining to the tunnel, the first donor DU can remove a first BAP header, which can be a proxy BAP header. The proxy BAP header can overwrite/replace an original BAP header, for example.

In some examples, the UL packet has a second BAP header. The second BAP header is the original BAP header. Further, the second BAP header can be derived based on a source Internet Protocol (IP) address of the UL packet.

In some examples, the tunnel can be established using at least an IP address of the first donor DU.

In an example, after removing the first BAP header, the first donor DU can determine that the UL packet is to be transmitted to the second donor DU, based on an IP address of the UL packet.

Turning to FIG. 15, a flow chart of a method 300 performed by a second donor DU node to which traffic has been offloaded by a first donor DU, in a proxy-based inter-donor topology adaptation in an IAB network, for example, will be described. The first donor DU may be the target DU (e.g. DU_2 of FIG. 8) and the second donor DU can be a source DU (DU_1 of FIG. 8). This method can be applicable to UL traffic. Method 300 may comprise:

Step 310: receiving an uplink (UL) packet from the first donor DU, via a tunnel being established between the first donor DU and the second donor DU, the UL packet having a header pertaining to the tunnel and destined to the second donor DU and originated from an IAB node which has a communication path to the second donor DU that is unavailable;

Step 320: removing the header pertaining to the tunnel from the UL packet; and Step 330: sending the UL packet to a network node.

In some examples, the tunnel can be a GPRS Tunnelling Protocol (GTP) tunnel or any other secure tunnels as will be appreciated by a person skilled in the art.

In some examples, the UL packet may comprise a BAP header.

In an example, the sent UL packet to a network node may be based on the BAP header.

In some examples, the BAP header can be derived based on a source Internet Protocol (IP) address of the UL packet.

FIG. 16 illustrates a flow chart a method 400 performed by a first donor DU node for offloading traffic to a second donor DU, in a proxy-based inter-donor topology adaptation in an IAB network, for example. The first donor DU may be the source DU (e.g. DU_1 of FIG. 8) and the second donor DU can be a target DU (DU_2 of FIG. 8). This method can be applicable to DL traffic. Method 400 may comprise:

Step 410: receiving a downlink (DL) packet, from a centralized unit (CU);

Step 420: appending a header pertaining a tunnel to the DL packet;

Step 430: sending the DL packet with the appended header to the second donor DU via the tunnel, the tunnel being established between the first donor DU and the second donor DU.

In some examples, the tunnel can be a GPRS Tunnelling Protocol (GTP) tunnel.

In some examples, prior to appending the header pertaining to the tunnel to the DL packet, the first donor DU can append a first BAP header to the DL packet.

In some examples, appending the first BAP header to the DL packet may comprise overwriting an original BAP header.

In an example, the first donor DU may append a second BAP header to the DL packet.

In some examples, the first donor DU may receive information for establishing the tunnel, from the CU to which the first donor DU is connected.

In some examples, the information may comprise one or more of a GTP tunnel endpoint identity (ID) and IP address of the second donor DU.

In some examples, the first donor DU may determine the first BAP header or the second BAP header based on one or more of the following information: a destination IP address, DSCP/DS, a flow label value in an IP packet header of the DL packet.

In some examples, the second BAP header may comprise an explicit or implicit flag to indicate that the first BAP header is present.

Furthermore, a method in an IAB network, for offloading traffic from a first donor DU to a second donor DU in a proxy-based inter-donor topology adaptation, is provided. The method may comprise:

At a first IAB node, to which a second IAB node is connected:

a. receiving a UL data packet from the second IAB node or UE, the UL data packet having a first/original BAP header;

b. appending a second BAP header/proxy BAP header to the received UL data packet;

c. sending the UL data packet to the second donor DU;

At the second donor DU:

a. removing the second BAP header from the data packet;

b. encapsulating the data packet with a GTP header;

c. sending the encapsulated packet to the first donor DU, via a tunnel.

In some examples, at the first donor DU, the first donor DU may remove the original BAP header from the encapsulated data packet and send the data packet to a first CU.

In some examples, the tunnel is a GTP tunnel or any other secure tunnels, as will be appreciated by a person skilled in the art.

Figure 17:
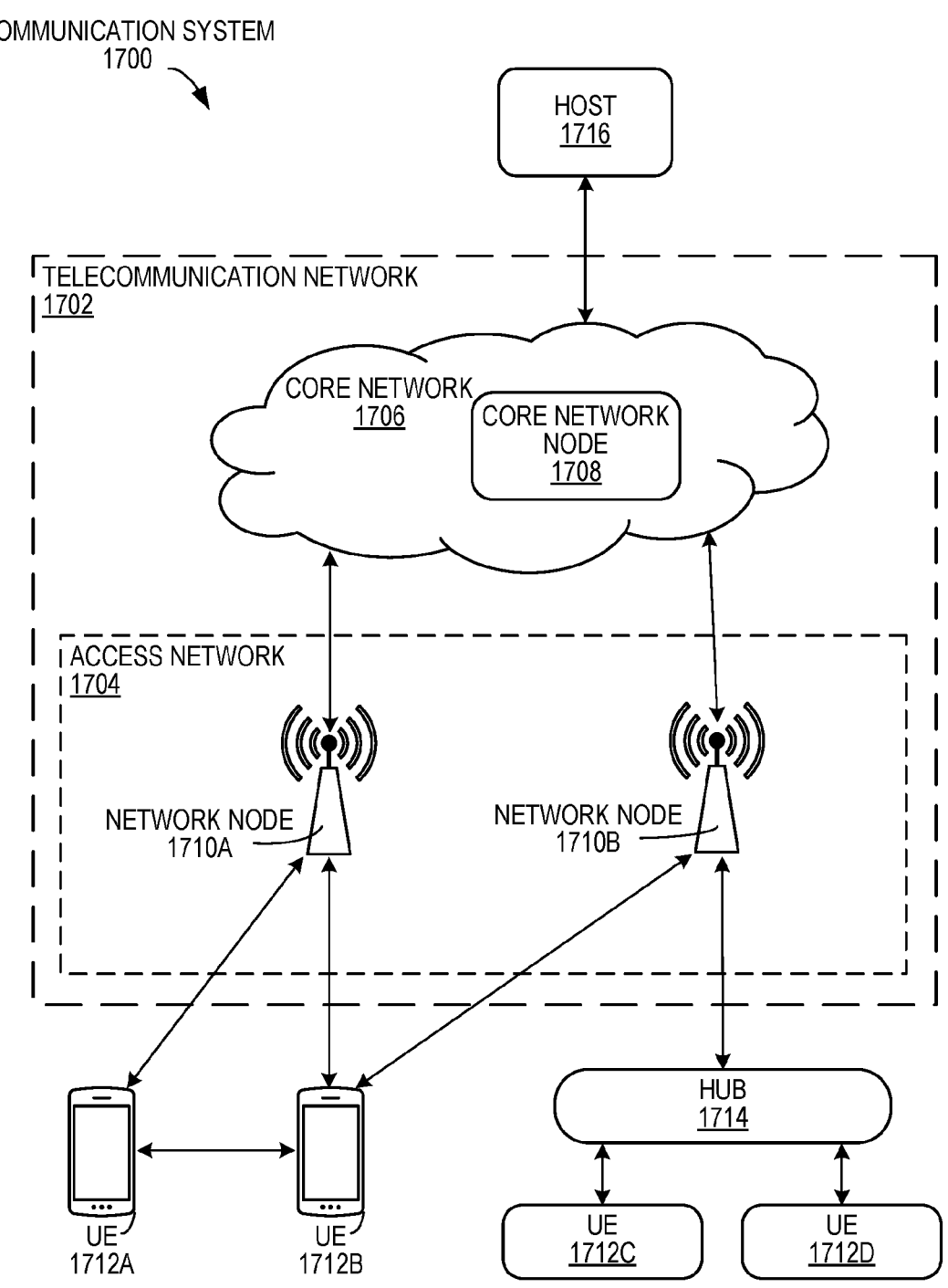
FIG. 17 shows an example of a communication system, according to an embodiment.

FIG. 17 shows an exemplary communication system 1700 according an embodiment.

In the example, the communication system 1700 includes a telecommunication network 1702 that includes an access network 1704, such as a radio access network (RAN), and a core network 1706, which includes one or more core network nodes 1708. The access network 1704 includes one or more access network nodes, such as network nodes 1710*a* and 1710*b* (one or more of which may be generally referred to as network nodes 1710), or any other similar 3GPP access node or non-3GPP access point. The network nodes 1710 facilitate direct or indirect connection of user equipment (UE), such as by connecting UEs 1712*a*, 1712*b*, 1712*c*, and 1712*d* (one or more of which may be generally referred to as UEs 1712) to the core network 1706 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1700 may include any number of wired or wireless networks, network nodes, UEs, and/or any other components or systems that may facilitate or participate in the communication of data and/or signals whether via wired or wireless connections. The communication system 1700 may include and/or interface with any type of communication, telecommunication, data, cellular, radio network, and/or other similar type of system.

The UEs 1712 may be any of a wide variety of communication devices, including wireless devices arranged, configured, and/or operable to communicate wirelessly with the network nodes 1710 and other communication devices. Similarly, the network nodes 1710 are arranged, capable, configured, and/or operable to communicate directly or indirectly with the UEs 1712 and/or with other network nodes or equipment in the telecommunication network 1702 to enable and/or provide network access, such as wireless network access, and/or to perform other functions, such as administration in the telecommunication network 1702.

In the depicted example, the core network 1706 connects the network nodes 1710 to one or more hosts, such as host 1716. These connections may be direct or indirect via one or more intermediary networks or devices. In other examples, network nodes may be directly coupled to hosts. The core network 1706 includes one more core network nodes (e.g., core network node 1708) that are structured with hardware and software components. Features of these components may be substantially similar to those described with respect to the UEs, network nodes, and/or hosts, such that the descriptions thereof are generally applicable to the corresponding components of the core network node 1708. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1716 may be under the ownership or control of a service provider other than an operator or provider of the access network 1704 and/or the telecommunication network 1702, and may be operated by the service provider or on behalf of the service provider. The host 1716 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1700 of FIG. 17 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1702 is a cellular network that implements 3GPP standardized features. Accordingly, the telecommunications network 1702 may support network slicing to provide different logical networks to different devices that are connected to the telecommunication network 1702. For example, the telecommunications network 1702 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1712 are configured to transmit and/or receive information without direct human interaction. For instance, a UE may be designed to transmit information to the access network 1704 on a predetermined schedule, when triggered by an internal or external event, or in response to requests from the access network 1704. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1714 communicates with the access network 1704 to facilitate indirect communication between one or more UEs (e.g., UE 1712c and/or 1712d) and network nodes (e.g., network node 1710b). In some examples, the hub 1714 may be a controller, router, content source and analytics, or any of the other communication devices described herein regarding UEs. For example, the hub 1714 may be a broadband router enabling access to the core network 1706 for the UEs. As another example, the hub 1714 may be a controller that sends commands or instructions to one or more actuators in the UEs. Commands or instructions may be received from the UEs, network nodes 1710, or by executable code, script, process, or other instructions in the hub 1714. As another example, the hub 1714 may be a data collector that acts as temporary storage for UE data and, in some embodiments, may perform analysis or other processing of the data. As another example, the hub 1714 may be a content source. For example, for a UE that is a VR headset, display, loudspeaker or other media delivery device, the hub 1714 may retrieve VR assets, video, audio, or other media or data related to sensory information via a network node, which the hub 1714 then provides to the UE either directly, after performing local processing, and/or after adding additional local content. In an example, the hub 1714 acts as a proxy server or orchestrator for the UEs, e.g. if one or more of the UEs are low energy IoT devices.

The hub 1714 may have a constant/persistent or intermittent connection to the network node 1710b. The hub 1714 may also allow for a different communication scheme and/or schedule between the hub 1714 and UEs (e.g., UE 1712c and/or 1712d), and between the hub 1714 and the core network 1706. In other examples, the hub 1714 is connected to the core network 1706 and/or one or more UEs via a wired connection. Moreover, the hub 1714 may be configured to connect to an M2M service provider over the access network 1704 and/or to another UE over a direct connection. In some scenarios, UEs may establish a wireless connection with the network nodes 1710 while still connected via the hub 1714 via a wired or wireless connection. In some embodiments, the hub 1714 may be a dedicated hub—that is, a hub whose primary function is to route communications to/from the UEs from/to the network node 1710b. In other embodiments, the hub 1714 may be a non-dedicated hub—that is, a device which is capable of operating to route communications between the UEs and network node 1710b, but which is additionally capable of operating as a communication start and/or end point for certain data channels.

Figure 18:
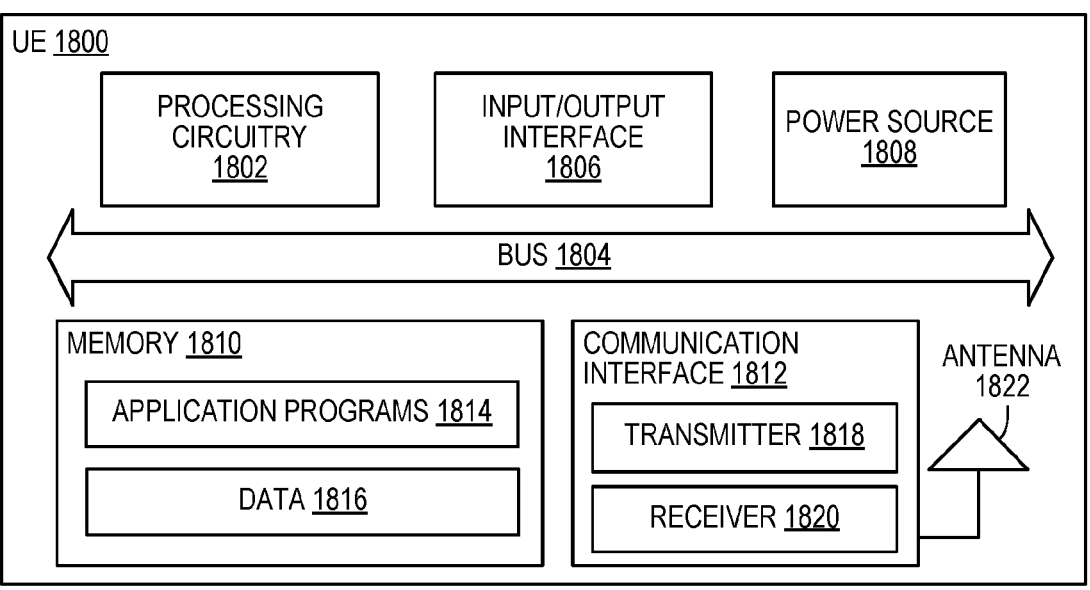
FIG. 18 shows a schematic diagram of a UE, according to an embodiment.

FIG. 18 shows a UE 1800 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3GPP, including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1800 includes processing circuitry 1802 that is operatively coupled via a bus 1804 to an input/output interface 1806, a power source 1808, a memory 1810, a communication interface 1812, and/or any other component, or any combination thereof. Some UEs may use all or a subset of the components shown in FIG. 18. The level of integration between the components may vary from one UE to another UE. Further, certain UEs may contain multiple instances of a component, such as multiple processors, memories, transceivers, transmitters, receivers, etc.

The processing circuitry 1802 is configured to process instructions and data and may be configured to implement any sequential state machine operative to execute instructions stored as machine-readable computer programs in the memory 1810. The processing circuitry 1802 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1802 may include multiple central processing units (CPUs).

In the example, the input/output interface 1806 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1800. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. An output device may use the same type of interface port as an input device. For example, a Universal Serial Bus (USB) port may be used to provide an input device and an output device.

In some embodiments, the power source 1808 is structured as a battery or battery pack. Other types of power sources, such as an external power source (e.g., an electricity outlet), photovoltaic device, or power cell, may be used. The power source 1808 may further include power circuitry for delivering power from the power source 1808 itself, and/or an external power source, to the various parts of the UE 1800 via input circuitry or an interface such as an electrical power cable. Delivering power may be, for example, for charging of the power source 1808. Power circuitry may perform any formatting, converting, or other modification to the power from the power source 1808 to make the power suitable for the respective components of the UE 1800 to which power is supplied.

The memory 1810 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1810 includes one or more application programs 1814, such as an operating system, web browser application, a widget, gadget engine, or other application, and corresponding data 1816. The memory 1810 may store, for use by the UE 1800, any of a variety of various operating systems or combinations of operating systems.

The memory 1810 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1810 may allow the UE 1800 to access instructions, application programs and the like, stored on transitory or non-transitory memory media, to off-load data, or to upload data. An article of manufacture, such as one utilizing a communication system may be tangibly embodied as or in the memory 1810, which may be or comprise a device-readable storage medium.

The processing circuitry 1802 may be configured to communicate with an access network or other network using the communication interface 1812. The communication interface 1812 may comprise one or more communication subsystems and may include or be communicatively coupled to an antenna 1822. The communication interface 1812 may include one or more transceivers used to communicate, such as by communicating with one or more remote transceivers of another device capable of wireless communication (e.g., another UE or a network node in an access network). Each transceiver may include a transmitter 1818 and/or a receiver 1820 appropriate to provide network communications (e.g., optical, electrical, frequency allocations, and so forth). Moreover, the transmitter 1818 and receiver 1820 may be coupled to one or more antennas (e.g., antenna 1822) and may share circuit components, software or firmware, or alternatively be implemented separately.

In the illustrated embodiment, communication functions of the communication interface 1812 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, NR, UMTS, WiMax, Ethernet, transmission control protocol/internet protocol (TCP/IP), etc.

Regardless of the type of sensor, a UE may provide an output of data captured by its sensors, through its communication interface 1812, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an IoT device, may be a device for use in one or more application domains, these domains comprising, but not limited to, city wearable technology, extended industrial application and healthcare. A UE in the form of an IoT device comprises circuitry and/or software in dependence of the intended application of the IoT device in addition to other components as described in relation to the UE 1800 shown in FIG. 18.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone.

Figure 19:
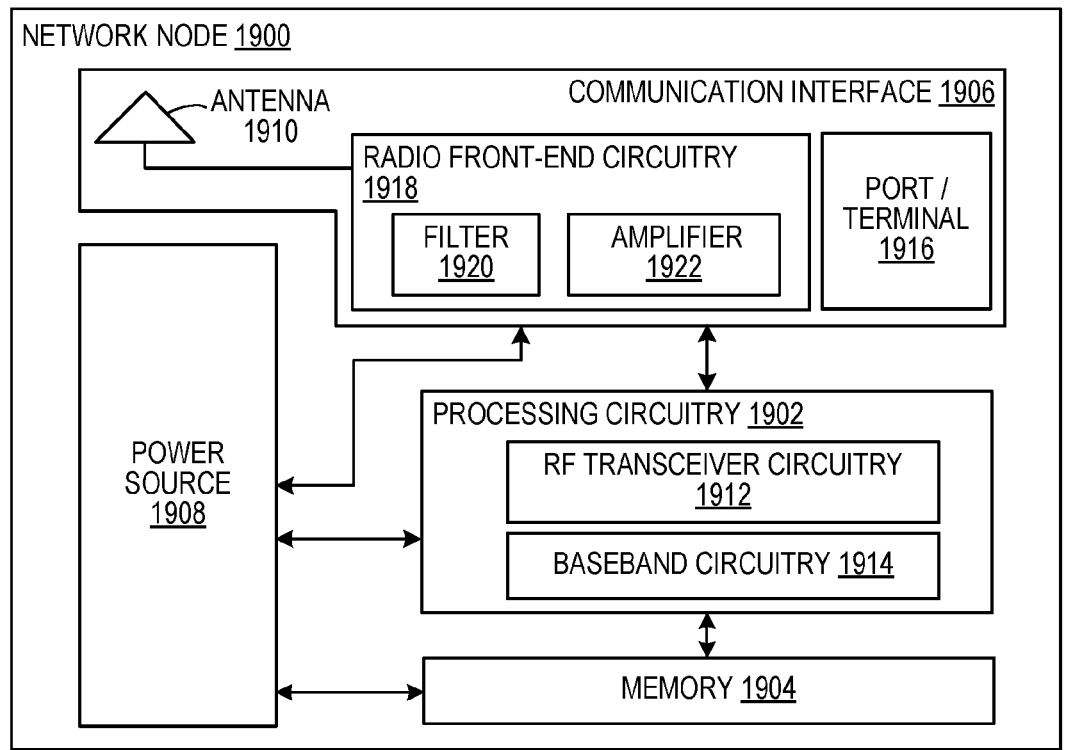
FIG. 19 shows a schematic diagram of a network node, according to an embodiment.

FIG. 19 shows a network node 1900 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and gNBs), donor DU, donor CU or IAB nodes.

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1900 includes a processing circuitry 1902, a memory 1904, a communication interface 1906, and a power source 1908. The network node 1900 may be composed of multiple physically separate components (e.g., a NB component and a RNC component, or a BTS component and a BSC component, etc.), which may each have their own respective components. In certain scenarios in which the network node 1900 comprises multiple separate components (e.g., BTS and BSC components), one or more of the separate components may be shared among several network nodes. For example, a single RNC may control multiple NBs. In such a scenario, each unique NB and RNC pair, may in some instances be considered a single separate network node. In some embodiments, the network node 1900 may be configured to support multiple radio access technologies (RATs). In such embodiments, some components may be duplicated (e.g., separate memory 1904 for different RATs) and some components may be reused (e.g., a same antenna 1910 may be shared by different RATs). The network node 1900 may also include multiple sets of the various illustrated components for different wireless technologies integrated into network node 1900, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1900.

The processing circuitry 1902 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1900 components, such as the memory 1904, to provide network node 1900 functionality. Furthermore, the processing circuitry 1902 may be configured to perform any of the steps of method 200 of FIG. 14, method 300 of FIG. 15 and method 400 of FIG. 16. In these cases, the network node may be a donor DU.

In some embodiments, the processing circuitry 1902 includes a system on a chip (SOC). In some embodiments, the processing circuitry 1902 includes one or more of radio frequency (RF) transceiver circuitry 1912 and baseband processing circuitry 1914. In some embodiments, the RF transceiver circuitry 1912 and the baseband processing circuitry 1914 may be on separate chips (or sets of chips), boards, or units, such as radio units and digital units. In alternative embodiments, part or all of RF transceiver circuitry 1912 and baseband processing circuitry 1914 may be on the same chip or set of chips, boards, or units.

The memory 1904 may comprise any form of volatile or non-volatile computer-readable memory including, without limitation, persistent storage, solid-state memory, remotely mounted memory, magnetic media, optical media, RAM, ROM, mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1902. The memory 1904 may store any suitable instructions, data, or information, including a computer program, software, an application including one or more of logic, rules, code, tables, and/or other instructions capable of being executed by the processing circuitry 1902 and utilized by the network node 1900. The memory 1904 may be used to store any calculations made by the processing circuitry 1902 and/or any data received via the communication interface 1906. In some embodiments, the processing circuitry 1902 and memory 1904 is integrated.

The communication interface 1906 is used in wired or wireless communication of signaling and/or data between a network node, access network, and/or UE. As illustrated, the communication interface 1906 comprises port(s)/terminal(s) 1916 to send and receive data, for example to and from a network over a wired connection. The communication interface 1906 also includes radio front-end circuitry 1918 that may be coupled to, or in certain embodiments a part of, the antenna 1910. Radio front-end circuitry 1918 comprises filters 1920 and amplifiers 1922. The radio front-end circuitry 1918 may be connected to an antenna 1910 and processing circuitry 1902. The radio front-end circuitry may be configured to condition signals communicated between antenna 1910 and processing circuitry 1902. The radio front-end circuitry 1918 may receive digital data that is to be sent out to other network nodes or UEs via a wireless connection. The radio front-end circuitry 1918 may convert the digital data into a radio signal having the appropriate channel and bandwidth parameters using a combination of filters 1920 and/or amplifiers 1922. The radio signal may then be transmitted via the antenna 1910. Similarly, when receiving data, the antenna 1910 may collect radio signals which are then converted into digital data by the radio front-end circuitry 1918. The digital data may be passed to the processing circuitry 1902. In other embodiments, the communication interface may comprise different components and/or different combinations of components.

In certain alternative embodiments, the network node 1900 does not include separate radio front-end circuitry 1918, instead, the processing circuitry 1902 includes radio front-end circuitry and is connected to the antenna 1910. Similarly, in some embodiments, all or some of the RF transceiver circuitry 1912 is part of the communication interface 1906. In still other embodiments, the communication interface 1906 includes one or more ports or terminals 1916, the radio front-end circuitry 1918, and the RF transceiver circuitry 1912, as part of a radio unit (not shown), and the communication interface 1906 communicates with the baseband processing circuitry 1914, which is part of a digital unit (not shown).

The antenna 1910 may include one or more antennas, or antenna arrays, configured to send and/or receive wireless signals. The antenna 1910 may be coupled to the radio front-end circuitry 1918 and may be any type of antenna capable of transmitting and receiving data and/or signals wirelessly. In certain embodiments, the antenna 1910 is separate from the network node 1900 and connectable to the network node 1900 through an interface or port.

The antenna 1910, communication interface 1906, and/or the processing circuitry 1902 may be configured to perform any receiving operations and/or certain obtaining operations described herein as being performed by the network node. Any information, data and/or signals may be received from a UE, another network node and/or any other network equipment. Similarly, the antenna 1910, the communication interface 1906, and/or the processing circuitry 1902 may be configured to perform any transmitting operations described herein as being performed by the network node. Any information, data and/or signals may be transmitted to a UE, another network node and/or any other network equipment.

The power source 1908 provides power to the various components of network node 1900 in a form suitable for the respective components (e.g., at a voltage and current level needed for each respective component). The power source 1908 may further comprise, or be coupled to, power management circuitry to supply the components of the network node 1900 with power for performing the functionality described herein. For example, the network node 1900 may be connectable to an external power source (e.g., the power grid, an electricity outlet) via an input circuitry or interface such as an electrical cable, whereby the external power source supplies power to power circuitry of the power source 1908. As a further example, the power source 1908 may comprise a source of power in the form of a battery or battery pack which is connected to, or integrated in, power circuitry. The battery may provide backup power should the external power source fail.

Embodiments of the network node 1900 may include additional components beyond those shown in FIG. 19 for providing certain aspects of the network node's functionality, including any of the functionality described herein and/or any functionality necessary to support the subject matter described herein. For example, the network node 1900 may include user interface equipment to allow input of information into the network node 1900 and to allow output of information from the network node 1900. This may allow a user to perform diagnostic, maintenance, repair, and other administrative functions for the network node 1900.

Figure 20:
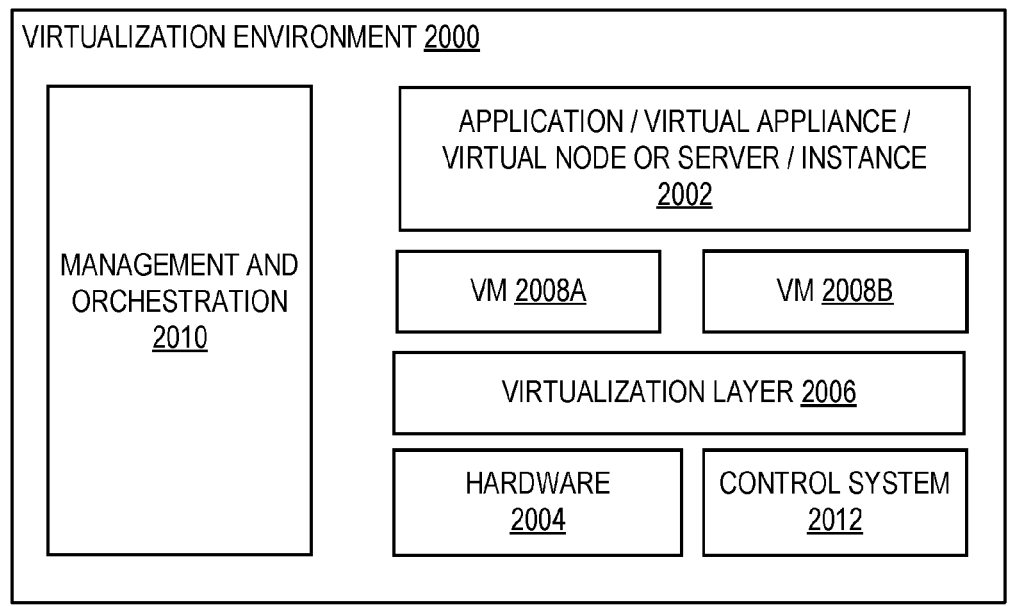
FIG. 20 illustrates a block diagram illustrating a virtualization environment.

FIG. 20 is a block diagram illustrating a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 2000 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 2002 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 2004 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 2006 (also referred to as hypervisors or virtual machine monitors (VMMs)), provide VMs 2008*a* and 2008*b* (one or more of which may be generally referred to as VMs 2008), and/or perform any of the functions, features and/or benefits described in relation with some embodiments described herein. The virtualization layer 2006 may present a virtual operating platform that appears like networking hardware to the VMs 2008.

The VMs 2008 comprise virtual processing, virtual memory, virtual networking or interface and virtual storage, and may be run by a corresponding virtualization layer 2006. Different embodiments of the instance of a virtual appliance 2002 may be implemented on one or more of VMs 2008, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 2008 may be a software implementation of a physical machine that runs programs as if they were executing on a physical, non-virtualized machine. Each of the VMs 2008, and that part of hardware 2004 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 2008 on top of the hardware 2004 and corresponds to the application 2002.

Hardware 2004 may be implemented in a standalone network node with generic or specific components. Hardware 2004 may implement some functions via virtualization. Alternatively, hardware 2004 may be part of a larger cluster of hardware (e.g. such as in a data center or CPE) where many hardware nodes work together and are managed via management and orchestration 2010, which, among others, oversees lifecycle management of applications 2002. In some embodiments, hardware 2004 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 2012 which may alternatively be used for communication between hardware nodes and radio units.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The above-described embodiments are intended to be examples only. Alterations, modifications and variations may be effected to the particular embodiments by those of skill in the art without departing from the scope of the description, which is defined solely by the appended claims.

What is claimed is:

1. A method performed by a first donor distributed unit (DU) connected to a first centralized unit (CU) for routing traffic to a second donor DU in an Integrated Access Backhaul (IAB) network, the method comprising:

receiving an uplink (UL) packet, destined to the second donor DU connected to a second CU different from the first CU, from an IAB node, which has a communication path to the second donor DU that is unavailable;

appending a header pertaining to a tunnel to the UL packet; and sending the UL packet through the tunnel to the second donor DU, the tunnel being established between the first donor DU and the second donor DU.

2. The method of claim 1, wherein the tunnel is a GPRS Tunnelling Protocol (GTP) tunnel.

3. The method of claim 1, further comprising, after receiving the UL packet and before appending the header pertaining the tunnel, removing a first Backhaul Adaptation Protocol (BAP) header.

4. The method of claim 3, wherein the first BAP header is a proxy BAP header.

5. The method of claim 3, further comprising, after removing the first BAP header, determining that the UL packet is to be transmitted to the second donor DU, based on an IP address of the UL packet.

6. The method of claim 1, wherein the UL packet has a second BAP header.

7. The method of claim 6, wherein the second BAP header is an original BAP header.

8. The method of claim 6, wherein the second BAP header is derived based on a source Internet Protocol (IP) address of the UL packet.

9. The method of claim 1, wherein the tunnel is established using at least an IP address of the first donor DU.

10. A method performed by a second donor distributed unit (DU) connected to a second centralized unit (CU) for receiving traffic from a first donor DU, in an Integrated Access Backhaul (IAB) network, the method comprising:

receiving an uplink (UL) packet from the first donor DU connected to a first centralized unit (CU) different from the second CU, via a tunnel being established between the first donor DU and the second donor DU, the UL packet having a header pertaining to the tunnel and destined to the second donor DU and originated from an IAB node which has a communication path to the second donor DU that is unavailable;

removing the header pertaining to the tunnel from the UL packet; and sending the UL packet to a network node.

11. The method of claim 10, wherein the tunnel is a GPRS Tunnelling Protocol (GTP) tunnel.

12. The method of claim 10, wherein the UL packet comprises a Backhaul Adaptation Protocol (BAP) header.

13. The method of claim 12, wherein sending the UL packet to a network node is based on the BAP header.

14. The method of claim 12, wherein the BAP header is derived based on a source Internet Protocol (IP) address of the UL packet.

15. A method performed by a first donor distributed unit (DU) connected to a first centralized unit (CU) for routing traffic to a second donor DU in an Integrated Access Backhaul (IAB) network, the method comprising:

eceiving a downlink (DL) packet, from the first centralized unit (CU);

appending a header pertaining a tunnel to the DL packet, the DL packet destined to an IAB node which has a communication path to the first donor DU that is unavailable; and sending the DL packet with the appended header to the second donor DU via the tunnel, the tunnel being established between the first donor DU and the second donor DU, wherein the second donor DU is connected to a second CU, different from the first CU.

16. The method of claim 15, wherein the tunnel is a GPRS Tunnelling Protocol (GTP) tunnel.

17. The method of claim 15, further comprising, prior to appending the header pertaining to the tunnel to the DL packet, appending a first BAP header to the DL packet.

18. The method of claim 17, wherein appending the first BAP header to the DL packet comprises overwriting an original BAP header.

19. The method of claim 15, further comprising receiving information for establishing the tunnel, from the first CU to which the first donor DU is connected.

20. The method of claim 19, wherein the information comprises one or more of a GTP tunnel endpoint identity (ID) and Internet Protocol (IP) address of the second donor DU.

* * * * *